(12) United States Patent
Chen et al.

(10) Patent No.: US 11,997,611 B2
(45) Date of Patent: May 28, 2024

(54) POWER CONTROL METHOD AND APPARATUS

(71) Applicant: GUANGDONG OPPO MOBILE TELECOMMUNICATIONS CORP., LTD., Guangdong (CN)

(72) Inventors: Wenhong Chen, Dongguan (CN); Yun Fang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/354,976

(22) Filed: Jul. 19, 2023

(65) Prior Publication Data
US 2023/0362826 A1 Nov. 9, 2023

Related U.S. Application Data

(63) Continuation of application No. PCT/CN2021/082206, filed on Mar. 22, 2021.

(51) Int. Cl.
*H04W 52/54* (2009.01)
*H04W 52/08* (2009.01)
*H04W 52/14* (2009.01)

(52) U.S. Cl.
CPC ......... *H04W 52/146* (2013.01); *H04W 52/08* (2013.01)

(58) Field of Classification Search
CPC ..... H04W 52/34; H04W 52/04; H04W 52/08; H04W 48/12; H04W 52/18; H04W 52/38; H04W 52/54
See application file for complete search history.

(56) References Cited

U.S. PATENT DOCUMENTS

| 2020/0221399 | A1 | 7/2020 | Hosseini et al. |
| 2021/0084596 | A1 | 3/2021 | Lee et al. |
| 2022/0116971 | A1* | 4/2022 | Saber ............... H04L 5/0035 |

FOREIGN PATENT DOCUMENTS

| CN | 104349439 B | 11/2017 |
| CN | 109963328 A | 7/2019 |
| EP | 3982572 A1 | 4/2022 |

OTHER PUBLICATIONS

Qualcomm Incorporated, Enhancements on Multi-TRP for PDCCH, PUCCH and PUSCH, R1-2009251, 3GPP TSG-RAN WG1 Meeting #103-e e-Meeting, Oct. 26-Nov. 13, 2020.
(Continued)

*Primary Examiner* — Tu X Nguyen
(74) *Attorney, Agent, or Firm* — BAYES PLLC

(57) ABSTRACT

Embodiments of the present application provide a power control method and apparatus. The method comprises: determining an effective transmit power control (TPC) command window according to a preset physical downlink control channel (PDCCH) in a plurality of PDCCHs that are repeatedly transmitted, the preset PDCCH comprising the first PDCCH or the last PDCCH in the plurality of PDCCHs; determining a closed-loop power adjustment state according to a TPC command in the effective TPC command window; and according to the closed-loop power adjustment state, determining the transmit power of an uplink signal of a terminal device.

13 Claims, 32 Drawing Sheets

(56) References Cited

OTHER PUBLICATIONS

Vivo, Enhancements on Multi-TRP for PDCCH, PUCCH and PUSCH, R1-2100422, 3GPP TSG RAN WG1 #104-e e-Meeting, Jan. 25-Feb. 5, 2021.
Ericsson, On PDCCH, PUCCH and PUSCH enhancements, R1-2101654, 3GPP TSG-RAN WG1Meeting #104e Jan. 26-Feb. 12, 2021.
Moderator (ZTE), Summary on [104-e-NR-7.1CRs-07], R1-2101966, 3GPP TSG RAN WG1 Meeting #104-e, e-Meeting, Jan. 25-Feb. 5, 2021.
Oppo, Enhancements on multi-TRP for PDCCH, PUCCH and PUSCH, R1-2107204, 3GPP TSG RAN WG1 #106-e e-Meeting, Aug. 16-27, 2021.
International Search Report and Written Opinion from the China National Intellectual Property Administration for International Application No. PCT/CN2021/082206 dated Dec. 27, 2021 (12 pages).
3GPP TSG RAN WG1 RAN1 Meeting #93, R1-1807626, MediaTek Inc., "Remaining issues of UL power control," May 21-25, 2018 (17 pages).
3GPP TSG RAN WG1 Meeting #96, R1-1903273, Change Request, Feb. 25-Mar. 1, 2019 (13 pages).
3GPP TSG RAN WG1 #102-e, R1-2005364, Vivo, "Discussion on enhancement on PDCCH PUCCH PUSCH in MTRP scenario," Aug. 17-28, 2020 (12 pages).
3GPP TS 38.213 V16.4.0 (Dec. 2020); 3rd Generation Partnership Project; Technical Specification Group Radio Access Network; NR; Physical layer procedures for control (Release 16) (181 pages).
3GPP TSG RAN WG1 #104-e, R1-2101447, Qualcomm Incorporated, "Enhancements on Multi-TRP for PDCCH, PUCCH and PUSCH," Jan. 25-Feb. 5, 2021 (28 pages).
3GPP TSG RAN WG1 #104-e, R1-2100119, Oppo, "Enhancements on multi-TRP for PDCCH, PUCCH and PUSCH," Jan. 25-Feb. 5, 2021 (16 pages).
Extended European Search Report issued in corresponding European application No. 21932051.2, mailed Jan. 22, 2024.

* cited by examiner

POWER CONTROL METHOD AND APPARATUS

CROSS-REFERENCE TO RELATED APPLICATION

This application is a continuation of PCT Application No. PCT/CN2021/082206, filed Mar. 22, 2021, the entire contents of which are incorporated herein by reference.

TECHNICAL FIELD

The present application relates to the field of communications, and in particular, to a power control method and apparatus.

BACKGROUND

Power control has always been a key technology in mobile communication systems. Power control can be divided into uplink power control and downlink power control according to uplink and downlink. By adjusting the uplink power, system performance can be effectively improved.

At present, when determining the uplink power in the related art, it is usually to determine the effective Transmit Power Control (TPC) command window according to the Physical Downlink Control Channel (PDCCH) that currently schedules the uplink signal and the PDCCH that previously scheduled the same type of uplink signal, and then determine the transmit power of the uplink signal according to the TPC command in the effective TPC command window.

However, in the case that the PDCCH used for scheduling the uplink signal is repeatedly transmitted, the terminal device cannot determine which window to use as the effective TPC command window, so that the accuracy of closed-loop power control cannot be guaranteed.

SUMMARY

Embodiments of the present application provide a power control method and apparatus, so as to avoid the problem that it is difficult to meet the diverse requirements of various networks or operators for measurement priorities.

In a first aspect, an embodiment of the present application provides a power control method, including:
  determining an effective transmit power control (TPC) command window according to a preset physical downlink control channel (PDCCH) in a plurality of repeatedly transmitted PDCCHs, where the preset PDCCH includes a headmost PDCCH or a last PDCCH in the plurality of PDCCHs;
  determining a closed-loop power adjustment state according to a TPC command in the effective TPC command window; and
  determining a transmit power of an uplink signal of a terminal device according to the closed-loop power adjustment state.

In a second aspect, an embodiment of the present application provides a power control apparatus, including:
  a determination module, configured to determine an effective transmit power control (TPC) command window according to a preset physical downlink control channel (PDCCH) in a plurality of repeatedly transmitted PDCCHs, where the preset PDCCH includes a headmost PDCCH or a last PDCCH in the plurality of PDCCHs;
  where the determination module is further configured to determine a closed-loop power adjustment state according to a TPC command in the effective TPC command window; and
  the determination module is further configured to determine a transmit power of an uplink signal of a terminal device according to the closed-loop power adjustment state.

In a third aspect, an embodiment of the present application provides a terminal device, including:
  a transceiver, a processor, and a memory;
  where the memory stores computer-executable instructions;
  the processor executes the computer-executable instructions stored in the memory, causing the processor to perform the method as described in the first aspect above.

In a fourth aspect, an embodiment of the present application provides a computer-readable storage medium, where the computer-readable storage medium stores computer-executable instructions, and when the computer-executable instructions are executed by a processor, the method described in the first aspect is implemented.

In a fifth aspect, an embodiment of the present application provides a computer program product, including a computer program, which implements the method described in the first aspect above when the computer program is executed by a processor.

The embodiments of the present application provide a power control method and apparatus, the method includes: determining an effective transmit power control (TPC) command window according to a preset physical downlink control channel (PDCCH) in a plurality of repeatedly transmitted PDCCHs, where the preset PDCCH includes a headmost PDCCH or a last PDCCH in the plurality of PDCCHs, determining a closed-loop power adjustment state according to a TPC command in the effective TPC command window, and according to the closed-loop power adjustment state, determining the transmit power of the uplink signal of the terminal device. When the PDCCH scheduling the uplink signal is repeatedly transmitted, a preset PDCCH may be determined from the plurality of repeatedly transmitted PDCCHs, and the preset PDCCH may be the first one and/or the last one of the plurality of repeatedly transmitted PDCCHs, then according to the preset PDCCH, the effective TPC command window is determined, so as to avoid the problem that the terminal device cannot determine the effective TPC command window, and then the transmit power of the uplink signal is controlled according to the effective TPC command window, thereby effectively ensuring the accuracy of closed-loop power control.

DETAILED DESCRIPTION

Figure 1:
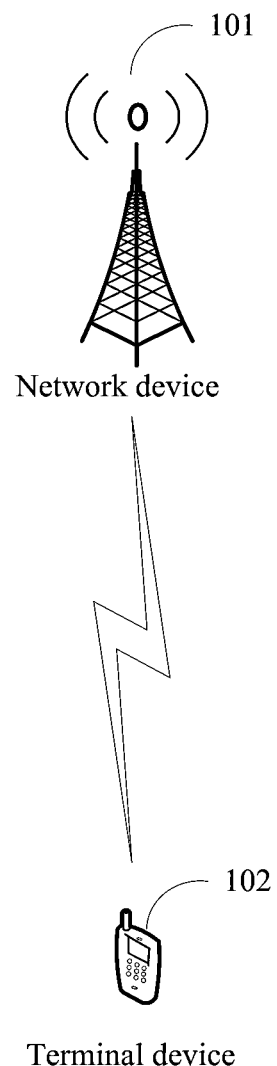
FIG. 1 is a schematic diagram of a communication scenario provided by an embodiment of the present application.

In order to facilitate understanding, the concepts involved in the present application will be explained first.

Terminal device: It may be a device that includes a wireless transceiver function and can cooperate with the network device to provide users with communication services. Specifically, the terminal device may refer to a User Equipment (UE), an access terminal, a subscriber unit, a subscriber station, a mobile station, a mobile, a remote station, a remote terminal, a mobile device, a user terminal, a terminal, a wireless communication device, a user agent or a user apparatus. For example, the terminal device may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to wireless modems, an in-vehicle device, a wearable device, a terminal device in future 5G networks or in post-5G networks, etc.

Network device: The network device may be a device used to communicate with the terminal device, for example, it may be a base station (Base Transceiver Station, BTS) in the Global System for Mobile Communication (GSM) or Code Division Multiple Access (CDMA) communication system, it may also be a base station (NodeB, NB) in the Wideband Code Division Multiple Access (WCDMA) system, and it may also be an Evolutional Node (eNB or eNodeB) in the LTE system, or the network device may be a relay station, an access point, a vehicle-mounted device, a wearable device, and a network-side device in a future 5G network or a network after 5G or a network device in the future evolved Public Land Mobile Network (PLMN) network, etc.

The network device involved in the embodiments of the present application may also be referred to as a Radio Access Network (RAN) device. The RAN device is connected with the terminal device to receive data from the terminal device and send it to the core network device. The RAN device corresponds to different devices in different communication systems. For example, in 2G system, it corresponds to the base station and the base station controller, in 3G system, it corresponds to the base station and the Radio Network Controller (RNC), in 4G system, it corresponds to an Evolutional Node B (eNB), and in the 5G system, it corresponds to an access network device (e.g., gNB, centralized unit (CU), distributed unit (DU)) in the 5G system, such as the New Radio (NR).

TPC command: The TPC command is used to indicate the adjustment of the uplink power. For example, the TPC command may indicate the amount of power adjustment, thereby indicating how much the power is increased, or how much the power is reduced, or can also indicate that the power is unchanged.

Power control: The power control can be divided into open-loop power control and closed-loop power control, in which the open-loop power control means that no feedback information from the receiving end is required, and power control is performed according to its own measurement, and the closed-loop power control means that the transmitting end controls the transmit power according to the feedback information sent by the receiving end.

Control Resource Set (CORESET): It is a type of time-frequency resource set introduced in NR, and the UE performs PDCCH detection in the corresponding control resource set. The control resource set consists of a set of resource particle groups (ResourceElement Group, REG).

Search space: In the LTE system, the search space is defined as a series of Control Channel Element (CCE) resources that need to be blindly detected for each aggregation level, including the starting position of the CCE and the number of candidate resources.

Common search space: One Common Search Space (CSS) is shared by all UEs in one cell.

UE-specific Search Space: One UE-specific Search Space (exclusive search space) is used by one UE.

PRB: Physical Resource Block (PRB).

OFDM: Orthogonal Frequency Division Multiplexing (OFDM).

Hereinafter, with reference to FIG. 1, a scenario to which the power control method in the present application is applicable will be described.

FIG. 1 is a schematic diagram of a communication scenario provided by an embodiment of the present application. Referring to FIG. 1, a network device 101 and a terminal device 102 are included, and wireless communication can be performed between the network device 101 and the terminal device 102.

The network including the network device 101 and the terminal device 102 may also be referred to as a Non-Terrestrial Network (NTN), where the NTN refers to the communication network between the terminal device and a satellite (also referred to as a network device).

It can be understood that the technical solutions in the embodiments of the present application can be applied to NR communication technology, where NR refers to a new generation of radio access network technology, which can be applied to future evolutionary networks, such as the 5th Generation Mobile communication (5G) system in the future. The solutions in the embodiments of the present application can also be applied to other wireless communication networks such as Wireless Fidelity (WIFI) and Long Term Evolution (LTE), and the corresponding names may also be replaced with the names of corresponding function in other wireless communication networks.

The network architecture and service scenarios described in the embodiments of the present application are for the purpose of illustrating the technical solutions of the embodiments of the present application more clearly, and do not constitute a limitation on the technical solutions provided by the embodiments of the present application. The person skilled in the art know that with the evolution of the network architecture and the emergence of new service scenarios, the technical solutions provided in the embodiments of the present application are also applicable to similar technical problems.

In the NR system, the network device may schedule uplink signals through the PDCCH, or may also send TPC commands to the terminal device through the PDCCH. In order to improve the detection efficiency of the PDCCH, the terminal device can determine the resource for detection of the PDCCH through the CORESET and the search space configured by the network device.

The CORESET is used to determine the size of the frequency domain resource (such as the number of occupied PRBs) and the size of the time domain resource (such as the number of occupied OFDM symbols) of PDCCH in one slot, and the CORESET may include a starting position of the frequency domain resource, a length of the frequency domain resource and a length of the time domain resource, etc.

The search space is used to determine the time domain resource position of the PDCCH, and the search space may include the starting position of the time domain resource and the monitoring period.

According to one CORESET and one search space configuration, the terminal can determine the physical resource position for detecting the PDCCH. For example, it can be understood by referring to FIG. 2, which is a schematic diagram of the implementation of determining the detection resource according to the CORESET and the search space provided by the embodiment of the present application.

Figure 2:
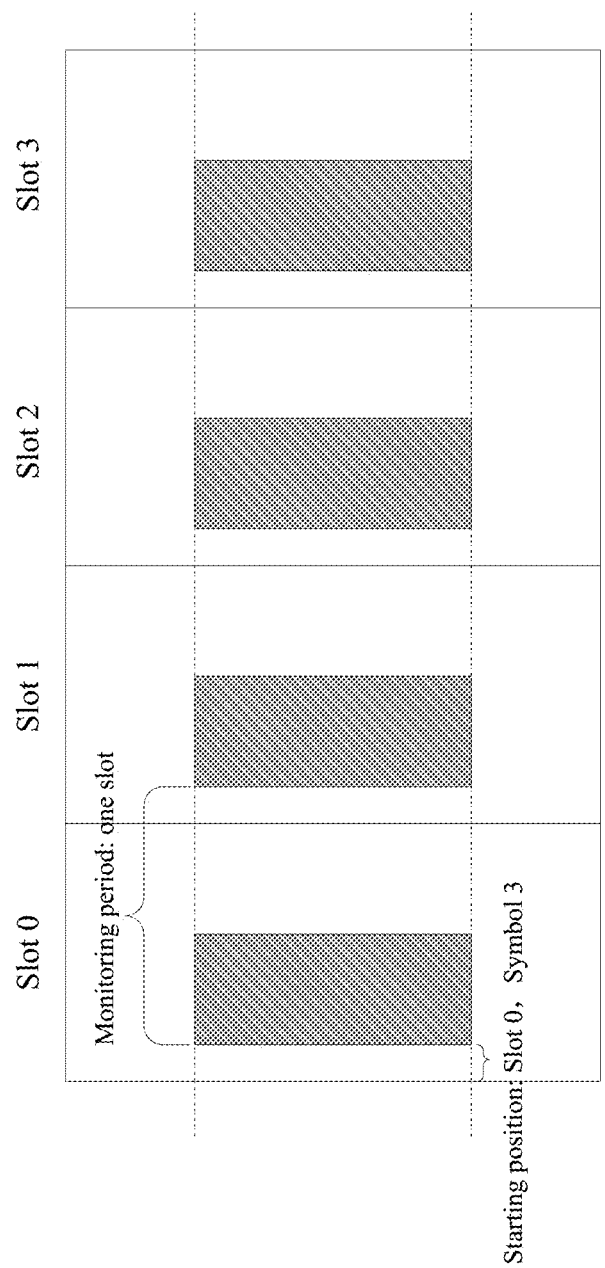
FIG. 2 is a schematic diagram of an implementation of determining a detection resource according to CORESET and a search space provided by an embodiment of the present application.

As shown in FIG. 2, according to the starting position of the frequency domain resource and the length of the frequency domain resource in CORESET, for example, the size of the frequency domain resource indicated by the shaded part in FIG. 2 can be determined; according to the starting position of the frequency domain resource indicated by the search space, such as "Starting position: slot 0, symbol 3" shown in FIG. 2, the size of the time domain resource indicated by the shaded part in FIG. 2 can be determined; and according to the monitoring period indicated by the search space, for example, "Monitoring period: 1 slot" shown in FIG. 2, the periodic detection resources, such as the plurality of shaded parts shown in FIG. 2 can be determined.

In the actual implementation process, the network device may configure up to three CORESETs through high-level signaling, and each CORESET has its own CORESET ID. At the same time, the network device may also configure at least one search space through high-level signaling, and the configuration parameter of each search space includes ID of the associated CORESET, an aggregation level, a search space type, and the like.

The search space type includes a configuration of whether the search space is a common search space (CSS) or a UE-specific search space (USS), and a DCI format that the terminal needs to detect in the search space.

If the search space is CSS, the search space type (searchSpaceType) in the search space is configured as Common, and the corresponding DCI format needing to be detected includes at least one formats of DCI format 2_0, DCI format 2_1, DCI format 2_2, DCI format 2_3, DCI format 0_0 and DCI format 1_0, that is, the DCI is generally used for scheduling transmission of the control information.

If the search space is USS, the corresponding DCI format needing to be detected includes DCI format 0_0 and DCI format 1_0 (formats0-0-And-1-0), or includes DCI format 0_1 and DCI format 1_1 (formats0-1-And-1-1), that is, the DCI is generally used for scheduling uplink or downlink data transmission.

Figure 3:
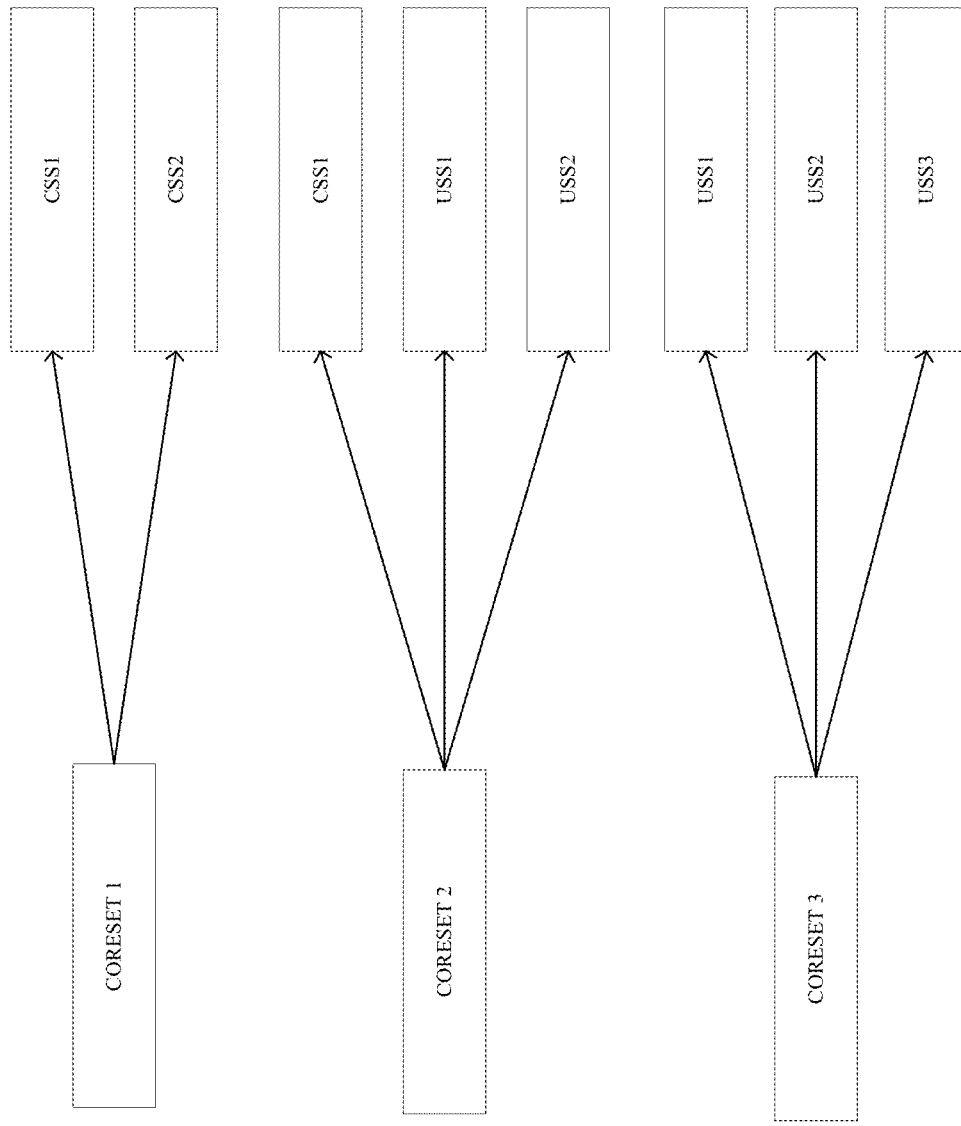
FIG. 3 is a schematic diagram of a possible association between CORSET and a search space provided by an embodiment of the present application.

Among them, each search space can only be associated with one CORESET, but one CORESET can be associated with a plurality of search spaces. For example, referring to FIG. 3, the association between CORSET and the search space can be understood. FIG. 3 is a schematic diagram of a possible association between CORSET and the search space provided by an embodiment of the present application.

As shown in FIG. 3, it is assumed that CORESET1, CORESET2, and CORESET3 are currently configured, where for example, CORESET1 may be associated with CSS1, CSS2, for example, CORESET2 may be associated with CSS1, USS1, USS2, for example, CORESET3 may be associated with USS1, USS2, USS3. As can be seen in FIG. 3, one search space is associated with only one CORESET, but one CORESET can be associated with a plurality of search spaces.

On the basis of the above introduction, several possible implementation manners of uplink power control are introduced below. In this embodiment, the uplink signal may include, for example, a Physical Uplink Shared Channel (PUSCH), a Physical Uplink Control Channel (PUCCH), a Sounding Reference Signal (SRS).

Among them, the transmit power of PUSCH may be calculated by the following formula 1:

$$P_{PUSCH,b,f,c}(i, j, q_d, 1) = \min\begin{Bmatrix} P_{CMAX,f,c}(i), \\ P_{0\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \\ \Delta_{TF,b,f,c}(i) + f_{b,f,c}(i, 1) \end{Bmatrix} \text{ formula 1}$$

where $P_{CMAX,f,c}(i)$ is the maximum transmit power on the current carrier of the terminal device, $M_{RB,b,f,c}^{PUSCH}(i)$ is the bandwidth of the PUSCH resource, i is the index of one PUSCH transmission; j is the open-loop power control index (including the target power $P_{0\_PUSCH,b,f,c}(j)$ and the path loss factor $\alpha_{b,f,c}(j)$); $q_d$ is the index of the reference signal used for path loss measurement, used to obtain the path loss value $PL_{b,f,c}(q_d)$, and is also an open-loop power control parameter; $f_{b,f,c}(i,1)$ is a closed-loop power control adjustment state, where l is the index of the closed-loop power control adjustment state.

The terminal device may determine the closed-loop power adjustment state according to the TPC command sent by the network device. In a possible implementation manner, the TPC command may be carried by the DCI used for scheduling the PUSCH in the UE search space, or, it may be carried by DCI format 2_2 for carrying a TPC command in the common search space.

The closed-loop power control adjustment states corresponding to different closed-loop power control adjustment state indexes are independently calculated, so that different PUSCH transmit powers can be obtained.

And, the transmit power of PUCCH can be calculated by the following formula:

$$P_{PUCCH,b,f,c}(i, q_u, q_d, 1) = \min\begin{Bmatrix} P_{CMAX,f,c}(i), \\ P_{0\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \\ \Delta_{TF,b,f,c}(i) + g_{b,f,c}(i, 1) \end{Bmatrix} \text{ formula 2}$$

where $P_{CMAX,f,c}(i)$ is the maximum transmit power on the current carrier of the terminal, $M_{RB,b,f,c}^{PUCCH}(i)$ is the bandwidth of the PUCCH resource, i is the index of one PUCCH transmission; $q_u$ is the index of the target power $P_{0\_PUCCH,b,f,c}$; $q_d$ is the index of the reference signal used for path loss measurement, and is used to obtain the path loss value $PL_{b,f,c}(q_d)$; $g_{b,f,c}(i,1)$ is the closed-loop power control adjustment state, where l is the index of the closed-loop power control adjustment state.

Similarly, the terminal device may determine the closed-loop power adjustment state according to the TPC command sent by the network device. In a possible implementation manner, the TPC command may be carried by the DCI used to schedule the PDSCH corresponding to the PUCCH in the UE search space, and may also be carried by the DCI format 2_2 used to carry a TPC command in the common search space.

The closed-loop power control adjustment states corresponding to different closed-loop power control adjustment state indexes are independently calculated, so that different PUCCH transmit powers can be obtained.

And, the transmit power of the SRS can be calculated by the following formula 3:

$$P_{SRS,b,f,c}(i, q_s, l) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot \\ PL_{b,f,c}(q_d) + h_{b,f,c}(i, l) \end{Bmatrix} \text{ formula 3}$$

where $P_{CMAX,f,c}(i)$ is the maximum transmit power on the current carrier of the terminal, $M_{SRS,b,f,c(i)}$ is the bandwidth of the SRS resource, i is the index of one SRS transmission, $q_s$ represents one SRS resource set, the target power $P_{O\_SRS,b,f,c}(q_s)$ and the path loss factor $\alpha_{SRS,b,f,c}(q_s)$ are the open-loop power control parameters corresponding to the SRS resource set $q_s$; $q_d$ is the index of the reference signal used for path loss measurement, is used to obtain the path loss value $PL_{b,f,c}(q_d)$, and is also one open-loop power control parameter; $h_{b,f,c}(i,l)$ is the closed-loop power control adjustment state, where l is the index of the closed-loop power control adjustment state, and the indexes of different closed-loop power control adjustment states correspond to independent closed-loop power control adjustment states.

Among them, the target power $P_{O\_SRS,b,f,c}(q_s)$, the path loss factor $\alpha_{SRS,b,f,c}(q_s)$ and $q_d$ are included in the configuration parameter of the SRS resource set, and are configured through high-level signaling to the terminal.

The closed-loop power adjustment state $h_{b,f,c}(i,l)$ may reuse the closed-loop power control adjustment state of PUSCH, or may use an independent closed-loop power control adjustment state, depending on the Radio Resource Control (RRC) configuration.

In a possible implementation manner, if the RRC signaling configures the SRS and PUSCH to adopt the same closed-loop power control adjustment state, then the index l of the reused closed-loop power control adjustment state of the PUSCH may be configured, that is, $h_{b,f,c}(i,l)=f_{b,f,c}(i,l)$.

In another possible implementation manner, if the high-layer signaling configures the SRS and the PUSCH to adopt independent closed-loop power control adjustment states, the network device may use the DCI format 2_3 in the common search space to indicate the TPC command of respective SRS of each terminal device, and the terminal determines the closed-loop power control adjustment state according to the TPC command. Then the current closed-loop power control adjustment state determined according to the TPC command has nothing to do with the closed-loop power control adjustment state of the PUSCH, and at this time, the terminal device can only support one closed-loop power control adjustment state independent of the PUSCH.

Further, the network device can configure whether the current independent closed-loop power control adjustment state adopts an accumulation mode or an absolute value mode through high-level signaling.

In a possible implementation manner, if the accumulation mode is adopted, the closed-loop power control adjustment state needs to accumulate the adjustment values indicated by the TPC commands received within a certain time window on the basis of the previous value. Taking PUSCH as an example, for example, the accumulation mode may be understood by referring to the following formula 4:

$$h_{b,f,c}(i)=h_{b,f,c}(i-i_0)+\Sigma_{m=0}^{\varsigma(s_i)-1}\delta_{SRS,b,f,c(m)} \quad \text{formula 4}$$

where $h_{b,f,c}(i)$ is the current closed-loop power control adjustment state determined after accumulation, $h_{b,f,c}(i-i_0)$ is the previous closed-loop power control adjustment state, $s_i$ may indicate the time window, $\delta_{SRS,b,f,c(m)}$ may be the adjustment value indicated by the TPC command within the time window, then $\Sigma_{m=0}^{\varsigma(s_i)-1}\delta_{SRS,b,f,c(m)}$ is the accumulation of the adjustment values indicated by the TPC commands received within a certain time window.

In another possible implementation manner, if the absolute value mode is adopted, the closed-loop power control adjustment state is directly equal to the adjustment value indicated by the TPC command recently received before a period of time. Taking SRS as an example, for example, the absolute value mode may be understood by referring to the formula 5:

$$h_{b,f,c}(i)=\delta_{SRS,b,f,c(i)} \quad \text{formula 5}$$

where $\delta_{SRS,b,f,c(i)}$ is the adjustment value indicated by the TPC command recently received before a period of time, and $h_{b,f,c}(i)$ is the currently determined closed-loop power adjustment state.

Based on the above description, it can be determined that the closed-loop power control adjustment state can be determined by the TPC command, and then the transmit power of the uplink information can be determined according to the closed-loop power control adjustment state. Therefore, it is particularly important to determine the control of the uplink power by the TPC command.

At present, when determining the TPC command, the effective TPC command window is usually determined first, and then the TPC command is determined in the effective TPC command window. The following is an example where the uplink signal is PUSCH to introduce the possible implementation manners of determining the effective TPC command window.

In a possible implementation manner, in the accumulation mode, for the PUSCH scheduled by DCI, a window between the first OFDM symbol after the most recent DCI used for scheduling PUSCH and the last OFDM symbol of the DCI currently used for scheduling PUSCH is determined as the effective TPC command window, and then the uplink power is determined according to the TPC command in the effective TPC command window.

Figure 4:
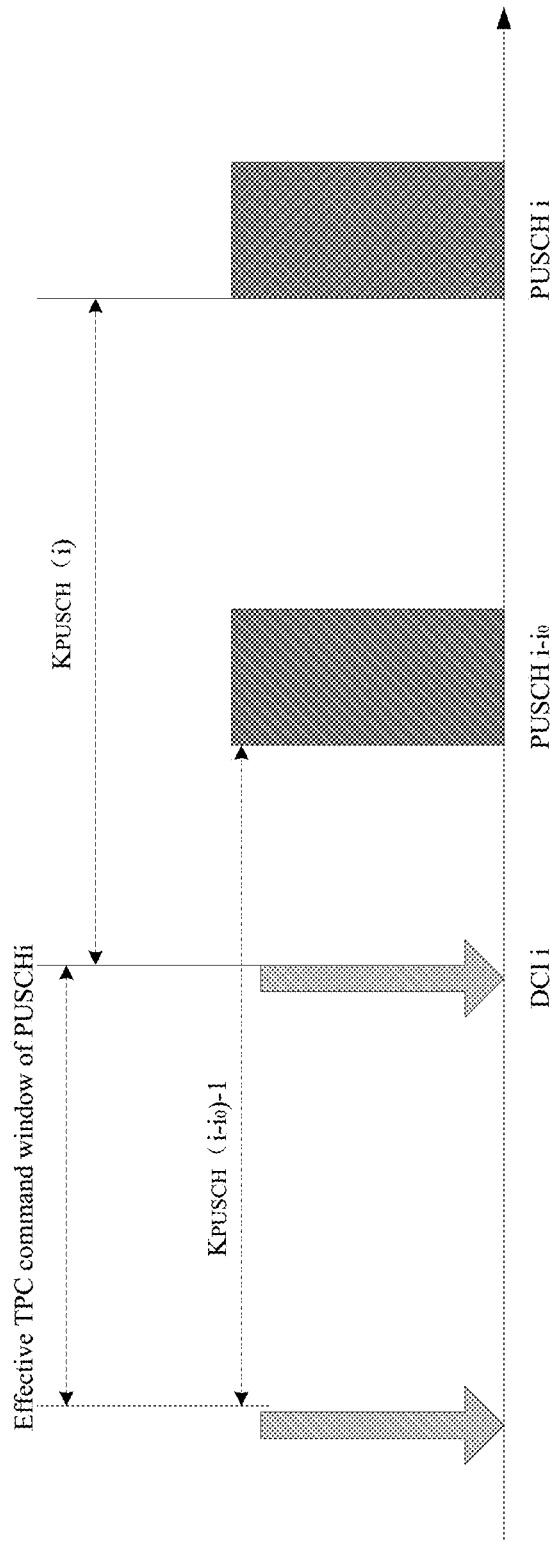
FIG. 4 is a schematic diagram of an implementation of determining a TPC command window in an accumulation mode without repeated transmission provided by an embodiment of the present application.

For example, it can be understood in conjunction with FIG. 4, which is a schematic diagram of an implementation of determining a TPC command window in an accumulation mode without repeated transmission provided by an embodiment of the present application.

As shown in FIG. 4, assuming that there is currently $DCI_{i-i_0}$ for scheduling $PUSCH_{i-i_0}$, and there is currently $DCI_i$ for scheduling $PUSCH_i$, $K_{PUSCH}(i-i_0)-1$ in FIG. 4 is the number of symbols between the first symbol after $DCI_{i-i_0}$ and the first symbol of $PUSCH_{i-i_0}$, $K_{PUSCH}(i)$ is the number of symbols between the last symbol of $DCI_i$ and the first symbol of $PUSCH_i$, then the effective command window of PUSCH, shown in FIG. 4 is a window from $K_{PUSCH}(i-i_0)-1$ symbols before the transmission opportunity $i-i_0$ of the PUSCH to $K_{PUSCH}(i)$ symbols before the transmission opportunity i of the PUSCH, where $i-i_0$ is the most recent transmission opportunity for transmitting the PUSCH before the transmission opportunity i of the PUSCH.

Based on the above description, it can be determined that in the accumulation mode, for the PUSCH scheduled by DCI, when determining the effective TPC command window, a window between the first symbol after a PDCCH (i.e., the last OFDM symbol of the PDCCH is before the last OFDM symbol of PDCCH that schedules PUSCH) for scheduling a same type of uplink signal most recently before the PDCCH used for scheduling the current uplink signal and the last OFDM symbol of the PDCCH used for scheduling the current uplink signal is determined as an effective TPC command window.

However, if the DCI used to schedule PUSCH transmission at a certain time is carried by the PDCCH of repeated transmission, that is to say, the PDCCH carrying the same control information is sent repeatedly for many times, and the PDCCH sent repeatedly for many times schedules the same PUSCH, that is, the PDCCH carrying the DCI is repeatedly sent at different moments, then which PDCCH is specifically used to determine the window of the effective TPC command is a problem that needs to be solved.

Figure 5:
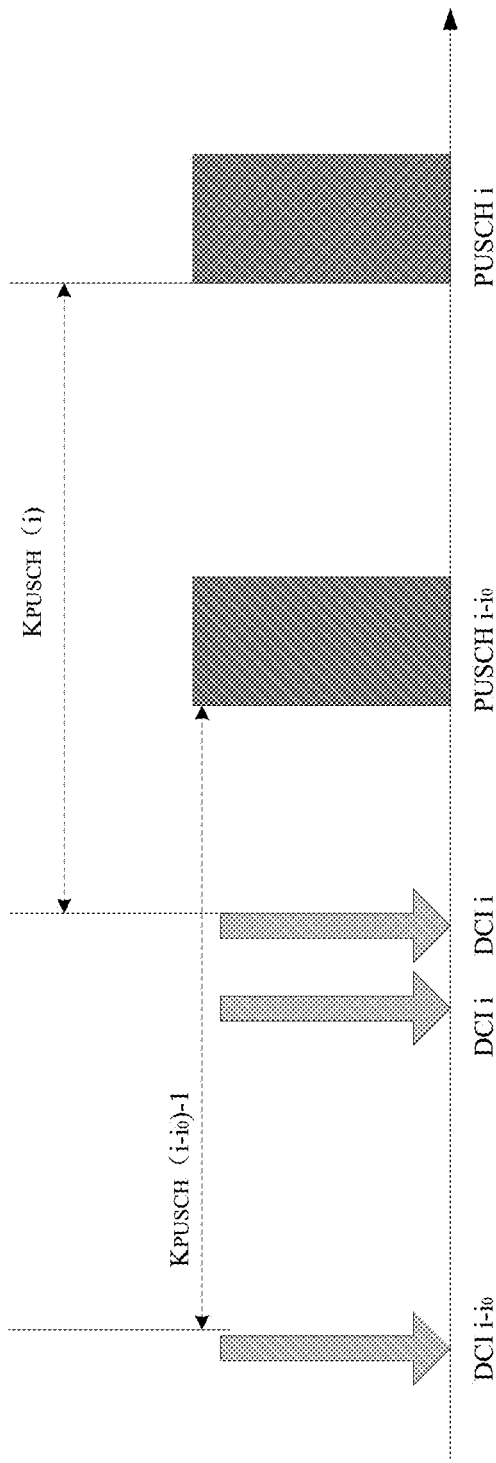
FIG. 5 is a schematic diagram of an implementation of PDCCH repeated transmission provided by an embodiment of the present application.

For example, it can be understood with reference to FIG. 5, which is a schematic diagram of the implementation of PDCCH repeated transmission provided by the embodiment of the present application.

As shown in FIG. 5, assuming that there is currently $DCI_{i-i_0}$ for scheduling $PUSCH_{i-i_0}$, and there is currently $DCI_i$ for scheduling $PUSCH_i$, where $DCI_i$ is repeatedly transmitted twice, based on the above introduction, it can be determined that the effective TPC command window needs to be determined according to the last symbol of $DCI_i$, but the current $DCI_i$ is repeatedly transmitted twice, it cannot be determined whether the first $DCI_i$ is used to determine the effective TPC command window or the second $DCI_i$ is used to determine the TPC effective command window.

After the effective TPC command window is determined, the closed-loop power adjustment state can be determined according to the TPC command in the effective TPC command window. However, if the DCI containing the TPC command in the effective TPC command window is also carried by the repeatedly transmitted PDCCH, then which PDCCH carries the TPC command to determine the uplink transmit power is also a problem to be solved.

The above describes the problems in determining the effective TPC command window and effective TPC for the PUSCH scheduled by DCI in the accumulation mode. In another possible implementation manner, the closed-loop power adjustment can also be performed in absolute value mode by scheduling PUSCH through High-layer signaling (Configured Grant).

In this case, the terminal device may determine the closed-loop power adjustment state by using the latest TPC command before $K_{PUSCH}$ (i) OFDM symbols configured by the network device.

Figure 6:
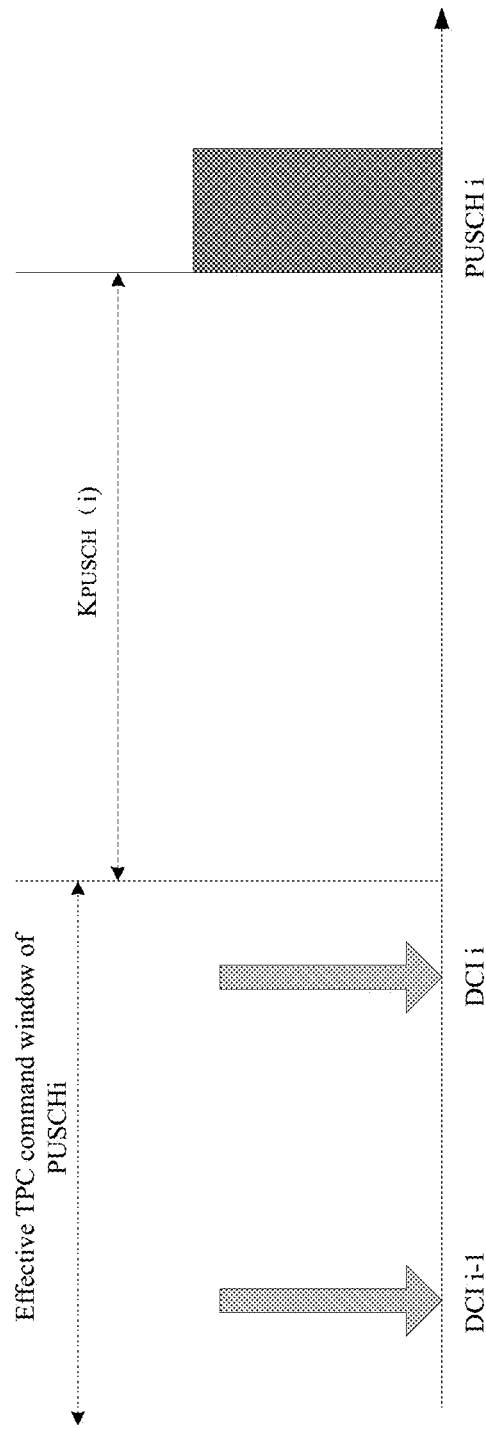
FIG. 6 is a schematic diagram of an implementation of determining an effective TPC command window in an absolute value mode without repeated transmission provided by an embodiment of the present application.

For example, reference may be made to FIG. 6, which is a schematic diagram of the implementation of determining an effective TPC command window in an absolute value mode without repeated transmission provided by an embodiment of the present application.

The current $DCI_i$ is used to schedule $PUSCH_i$, the terminal device can determine the window before $K_{PUSCH}$ (i) OFDM symbols before $PUSCH_i$ as the effective TPC command window of $PUSCH_i$, and the effective TPC command window can include a plurality of DCIs, for example, $DCI_{i-1}$ and $DCI_i$ shown in FIG. 6. Specifically, the closed-loop power adjustment state is determined according to the TPC command included in the last $DCI_i$ in this window.

Figure 7:
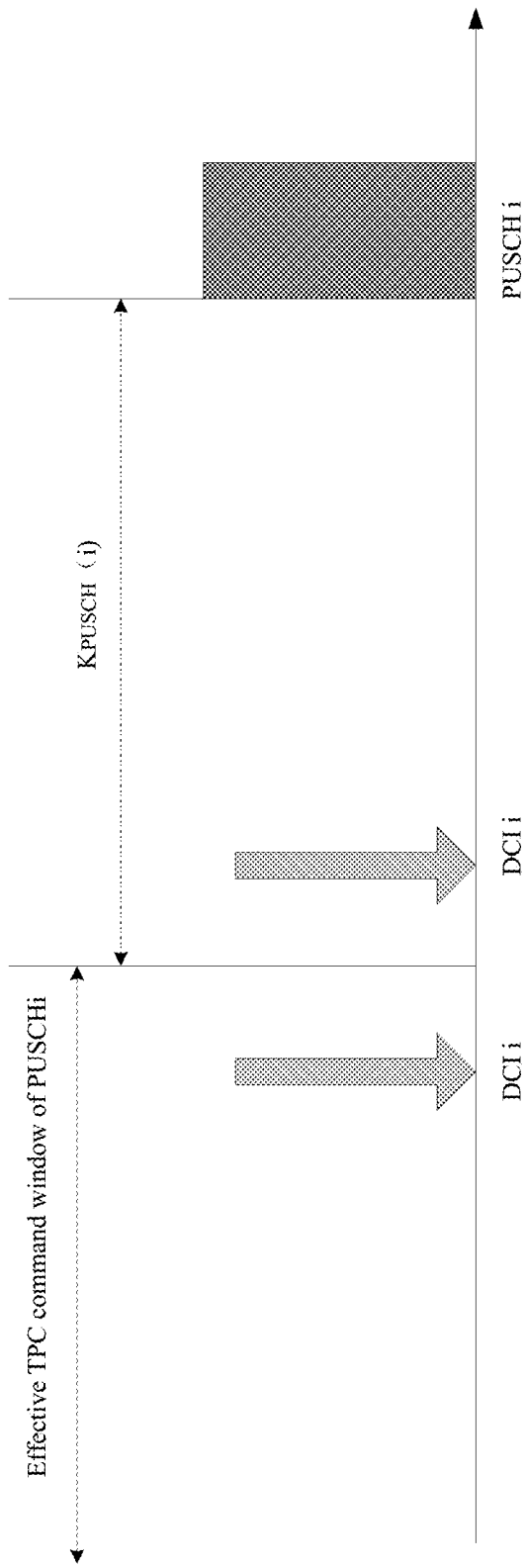
FIG. 7 is a schematic diagram of an implementation of repeated transmission of PDCCH carrying a TPC command provided by an embodiment of the present application.

However, if the DCI containing the most recent TPC command is carried by the repeatedly transmitted PDCCH, and part of the repeated transmission of the PDCCH is not within the effective window, for example, it can be understood with reference to FIG. 7, which is a schematic diagram of the implementation of the repeated transmission of PDCCH carrying the TPC command provided by the embodiment of the present application.

As shown in FIG. 7, the effective TPC command window of PUSCH, is currently determined according to $K_{PUSCH}$ (i). In this effective TPC command window, the $DCI_i$ used to indicate the TPC command is included, but the $DCI_i$ is repeatedly transmitted twice, one repeated transmission is in the effective TPC command window, and the other repeated transmission is not in the effective TPC command window, then the terminal cannot determine whether the TPC command indicated by $DCI_i$ can be used for PUSCH transmission at this time.

To sum up, when the PDCCH is repeatedly transmitted, the terminal device cannot determine the effective TPC command window, or the terminal device cannot determine whether the TPC command in the effective TPC command window is available, and thus the accuracy of closed-loop power control cannot be guaranteed.

In view of the problems in the related art, the present application proposes the following technical idea: when the PDCCH scheduling the uplink signal is repeatedly transmitted, or when the PDCCH carrying the TPC command of the uplink signal is repeatedly transmitted, the terminal device can select one reference PDCCH for determining the TPC accumulation window and/or the effective TPC in the TPC accumulation window from the repeatedly transmitted PDCCHs, thereby effectively ensuring the accuracy of closed-loop power control.

On the basis of the above-mentioned content, the power control method provided by the present application is described below with reference to specific embodiments.

Figure 8:
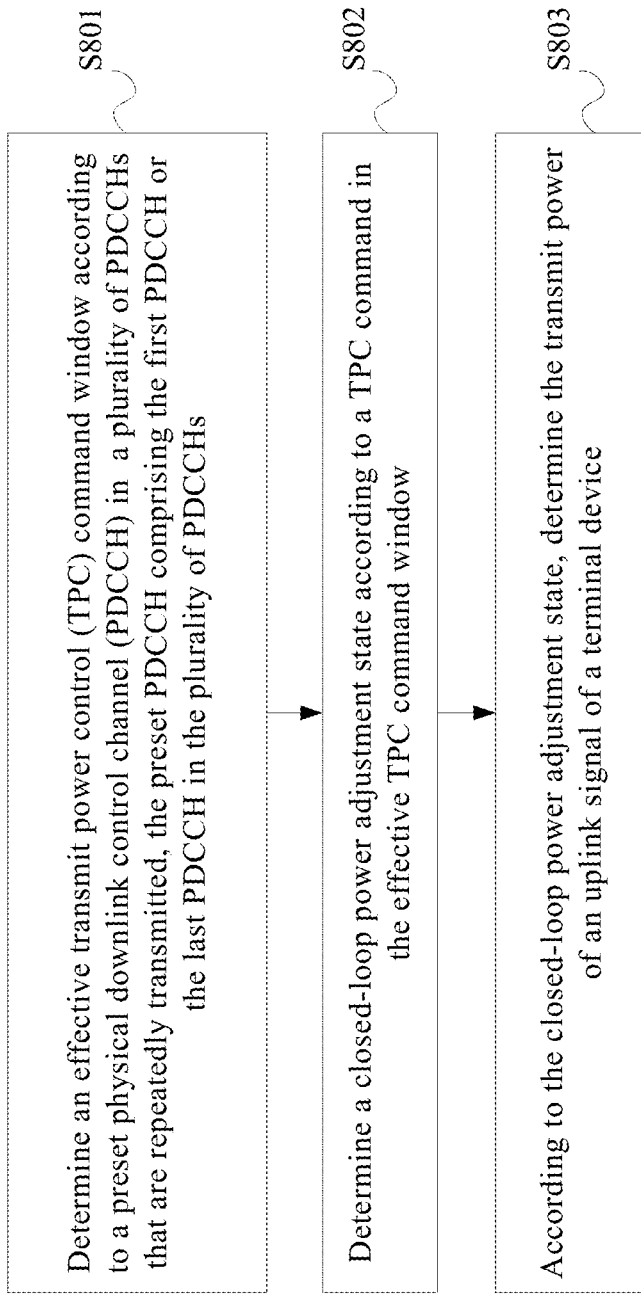
FIG. 8 is a flowchart of a power control method provided by an embodiment of the present application.

FIG. 8 is a flowchart of the power control method provided by the embodiment of the present application.

As shown in FIG. 8, the method includes the following steps.

In S801, an effective transmit power control (TPC) command window is determined according to a preset PDCCH in a plurality of repeatedly transmitted physical downlink control channels (PDCCHs), where the preset PDCCH includes the headmost PDCCH or the last PDCCH in the plurality of PDCCHs.

In this embodiment, the plurality of repeatedly transmitted PDCCHs may include, for example, a repeatedly transmitted first PDCCH, where the first PDCCH is a PDCCH used to schedule an uplink signal, and/or the plurality of repeatedly transmitted PDCCHs may also include a repeatedly transmitted second PDCCH, where the second PDCCH is the nearest PDCCH for scheduling an uplink signal of the same type before the PDCCH used to schedule the uplink signal.

In this embodiment, the uplink signal may include, for example, at least one of the following: PUSCH, PUCCH, or SRS. It can be understood that the above-mentioned PDCCH for scheduling the uplink signal of the same type means that the types of uplink signals are consistent.

For example, the current first PDCCH is the PDCCH used to schedule the PUSCH, then the second PDCCH is the most recent PDCCH used for scheduling PUSCH before the PDCCH used to schedule the PUSCH, that is to say, the PUSCH is one type, the PUCCH is another type, and the SRS is another type, when determining the second PDCCH, it needs to ensure that the type of the uplink signal scheduled by the second PDCCH and the type of the uplink signal scheduled by the first PDCCH are consistent.

Based on the above description, it can be determined that in the accumulation mode, the effective TPC command window can be determined according to the second PDCCH and the first PDCCH, and when the first PDCCH is repeatedly transmitted, and/or, when the second PDCCH is repeatedly transmitted, the effective TPC command window can be determined according to a preset PDCCH in the repeatedly transmitted PDCCHs.

The preset PDCCH may include the headmost PDCCH or the last PDCCH among the plurality of repeatedly transmitted PDCCHs.

In a possible implementation manner, for example, the current first PDCCH is repeatedly transmitted and the second PDCCH is transmitted for once, then for example, the effective TPC command window may be determined according to the second PDCCH and the headmost PDCCH in the repeatedly transmitted first PDCCH; or, the effective TPC command window may also be determined according to the last PDCCH in the repeatedly transmitted first PDCCH and the second PDCCH.

In another possible implementation manner, for example, the current second PDCCH is repeatedly transmitted and the first PDCCH is transmitted for once, then for example, the effective TPC command window may be determined according to the headmost PDCCH in the repeatedly transmitted second PDCCH and the first PDCCH; or, the effective TPC command window may also be determined according to the last PDCCH in the repeatedly transmitted second PDCCH and the first PDCCH.

In another possible implementation manner, for example, the current first PDCCH and the second PDCCH are both repeatedly transmitted, then for example, the effective TPC command window may be determined according to the headmost PDCCH in the repeatedly transmitted second PDCCH and the headmost PDCCH in the repeatedly transmitted first PDCCH; or, the effective TPC command window may also be determined according to the headmost PDCCH in the repeatedly transmitted second PDCCH and the last PDCCH in the repeatedly transmitted first PDCCH.

In this embodiment, the effective TPC command window is determined according to the preset PDCCH among the plurality of repeatedly transmitted PDCCHs, and the preset PDCCH may be the headmost PDCCH or the last PDCCH in the plurality of PDCCHs, so that the determination of the effective TPC command window can be achieved when the PDCCH is repeatedly transmitted.

In S802, a closed-loop power adjustment state is determined according to a TPC command in the effective TPC command window.

The TPC effective command window may include a TPC command, then the closed-loop power adjustment state may be determined according to the TPC command in the effective TPC command window, and its implementation manner may refer to the implementation manner of determining the closed-loop power adjustment state in the accumulation mode and the absolute value mode introduced in the above embodiments, which will not be repeated here.

In a possible implementation manner, the PDCCH used to carry the TPC command may also be repeatedly transmitted, then it may occur that part of the PDCCHs carrying the TPC command is in the effective TPC command window, and part of the PDCCHs is not in the effective TPC command window. In this case, the terminal device cannot determine whether to use this TPC command to determine the closed-loop power adjustment state.

In this case, for example, it can be determined whether the TPC command can be used to determine the closed-loop power adjustment state according to whether the headmost PDCCH in the repeatedly transmitted PDCCHs carrying the TPC command is in the effective TPC command window; or, it can be determined whether the TPC command can be used in the closed-loop power adjustment state according to whether the last PDCCH is in the effective TPC command window.

In S803, a transmit power of an uplink signal of the terminal device is determined according to the closed-loop power adjustment state.

After the closed-loop power adjustment state is determined, the transmit power of the uplink signal of the terminal device may be determined according to the above-described calculation method for the transmit power of each uplink signal.

The power control method provided by the embodiment of the present application includes: determining an effective transmit power control (TPC) command window according to a preset PDCCH in a plurality of repeatedly transmitted physical downlink control channels (PDCCHs), where the preset PDCCH includes the headmost PDCCH or the last PDCCH among the plurality of PDCCHs; and according to the TPC command in the effective TPC command window, determining the closed-loop power adjustment state. According to the closed-loop power adjustment state, the transmit power of the uplink signal of the terminal device is determined. When the PDCCH scheduling the uplink signal is repeatedly transmitted, a preset PDCCH may be determined from the plurality of repeatedly transmitted PDCCHs, and the preset PDCCH may be the first one and/or the last one of the plurality of repeatedly transmitted PDCCHs, and then according to the preset PDCCH, the effective TPC command window is determined, so as to avoid the problem that the terminal device cannot determine the effective TPC command window, and then the transmit power of the uplink signal is controlled according to the effective TPC command window, thereby effectively ensuring the accuracy of closed-loop power control.

On the basis of the above embodiment, it can be determined that the uplink signal can be PUSCH, or PUCCH, or SRS, and the closed-loop power adjustment state can be an accumulation mode or an absolute value mode. The following will introduce the implementation manners for controlling uplink power in various possible scenarios, combined with specific embodiments.

First, various possible implementation manners in which the uplink signal is PUSCH are introduced.

In a possible implementation manner, the closed-loop power adjustment state may be an accumulation mode, for example, the network device configures the current closed-loop power control state of the terminal device to be an accumulation mode through high-layer signaling.

Figure 9:
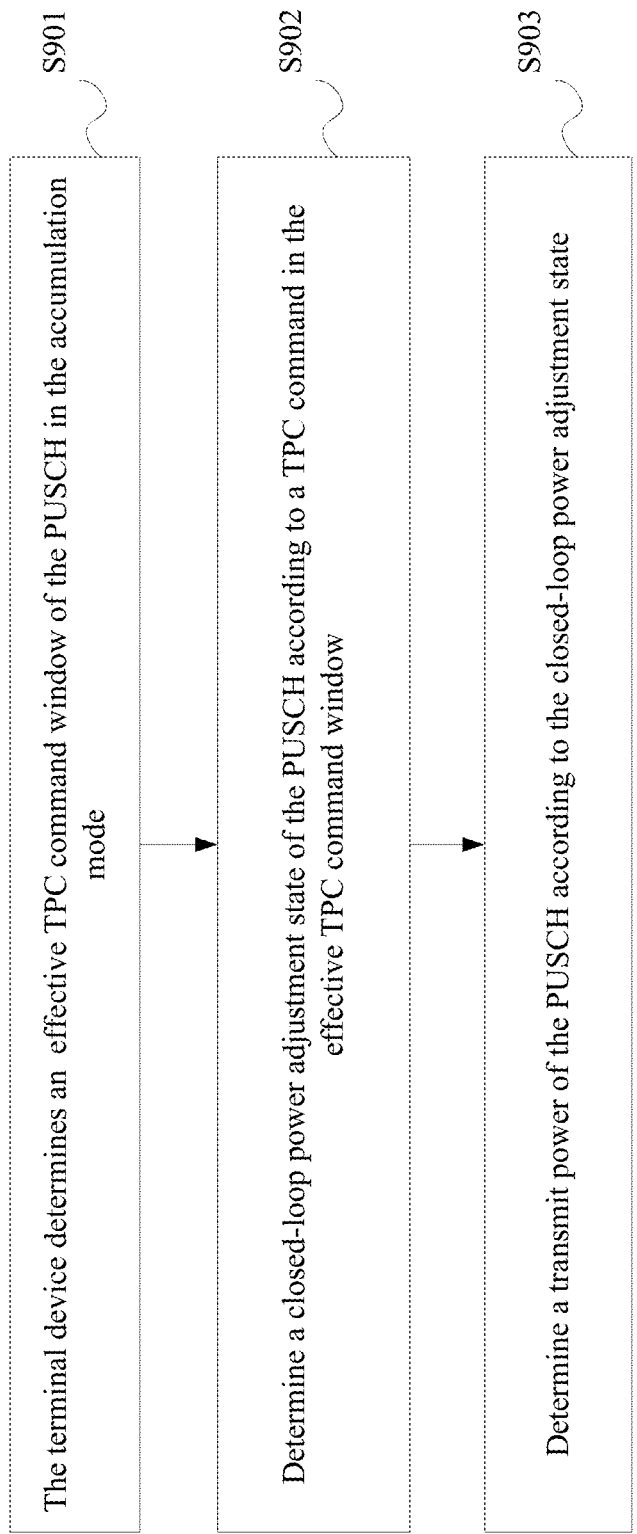
FIG. 9 is a second flowchart of a power control method provided by an embodiment of the present application.
Figure 10:
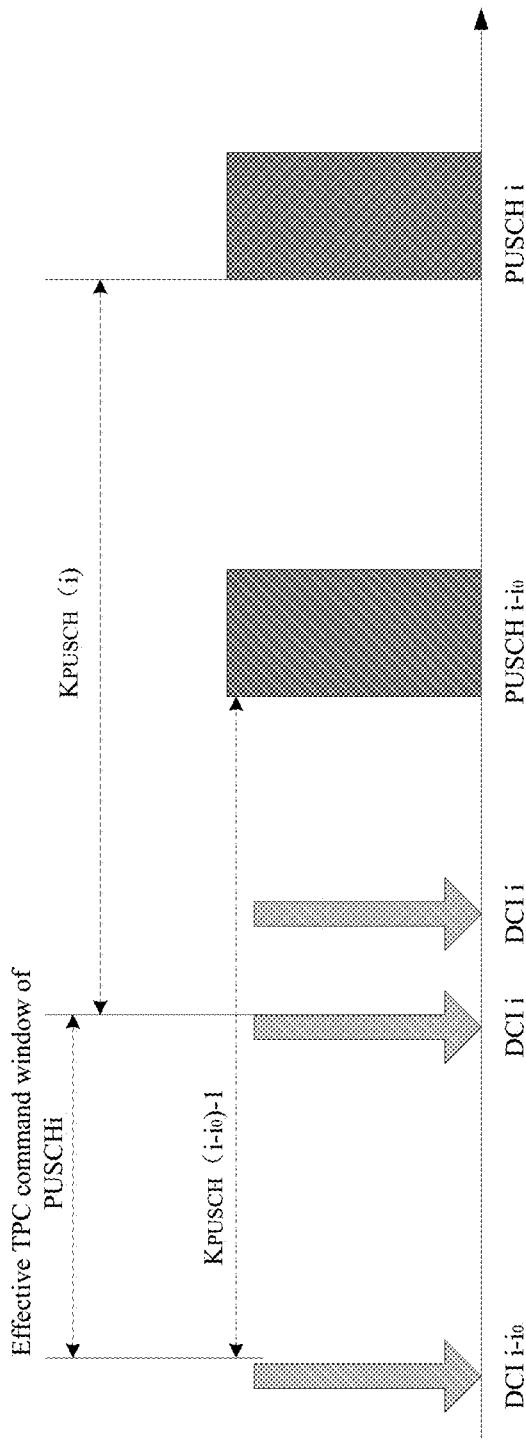
FIG. 10 is a first schematic diagram of an implementation of determining an effective TPC command window of the PUSCH in the accumulation mode provided by the embodiment of the present application.
Figure 11:
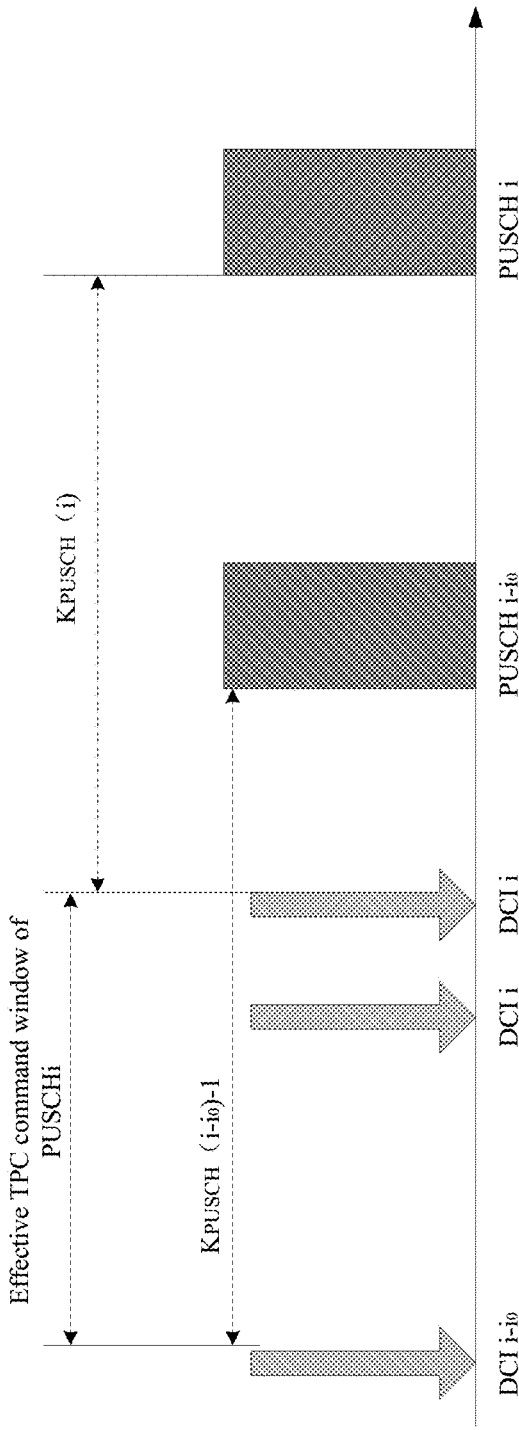
FIG. 11 is a second schematic diagram of an implementation of determining the effective TPC command window of the PUSCH in the accumulation mode provided by the embodiment of the present application.
Figure 12:
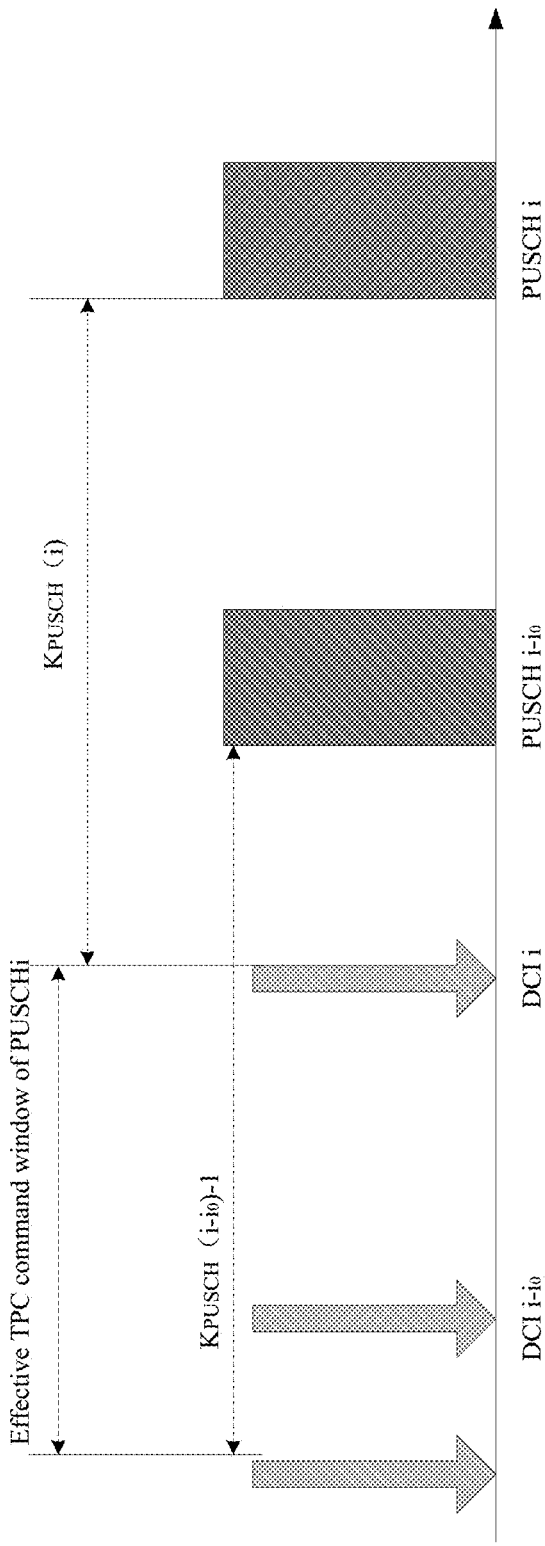
FIG. 12 is a third schematic diagram of an implementation of determining the effective TPC command window of the PUSCH in the accumulation mode provided by the embodiment of the present application.
Figure 13:
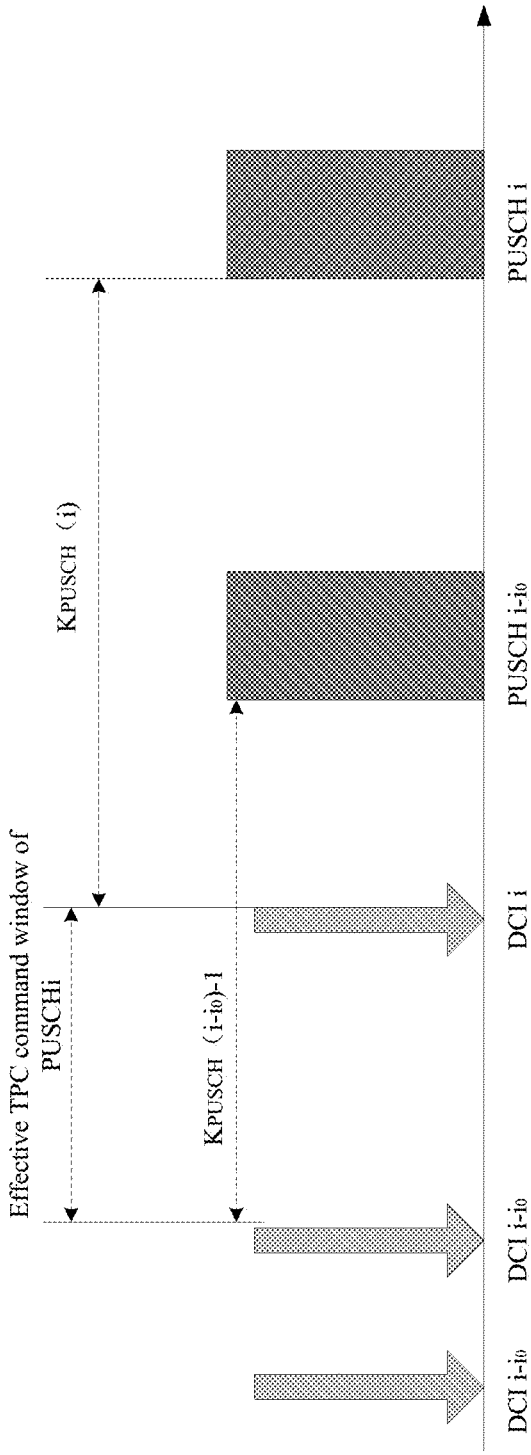
FIG. 13 is a fourth schematic diagram of an implementation of determining the effective TPC command window of the PUSCH in the accumulation mode provided by the embodiment of the present application.
Figure 14:
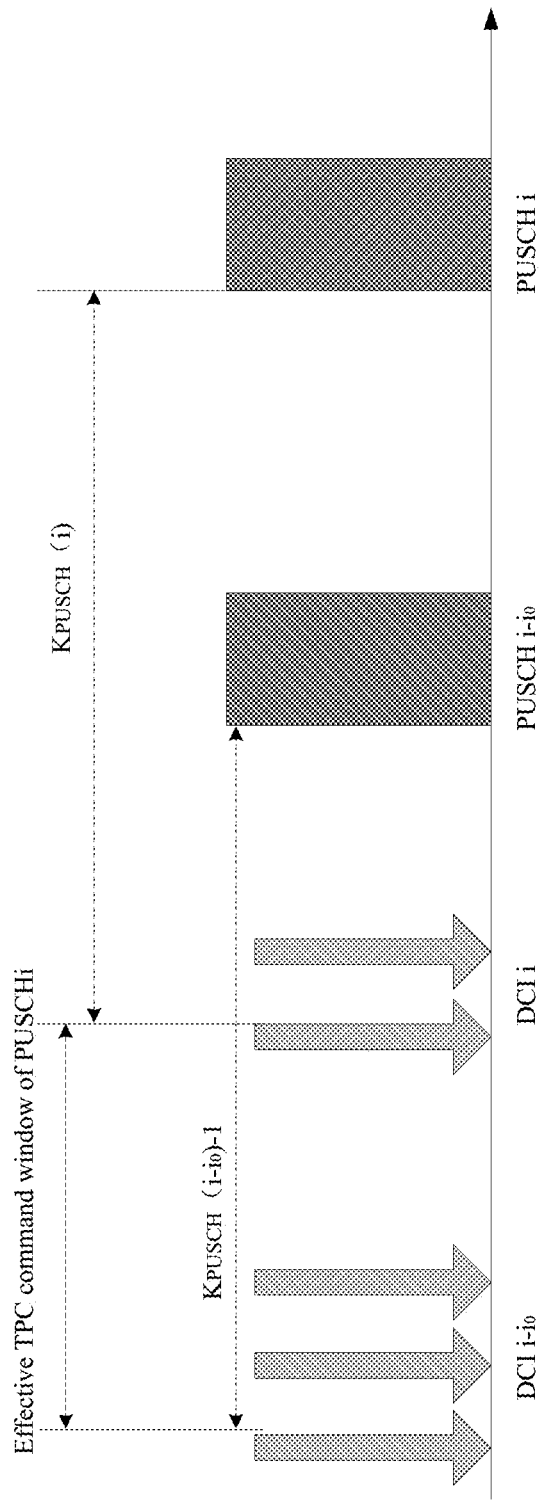
FIG. 14 is a fifth schematic diagram of an implementation of determining the effective TPC command window of the PUSCH in the accumulation mode provided by the embodiment of the present application.
Figure 15:
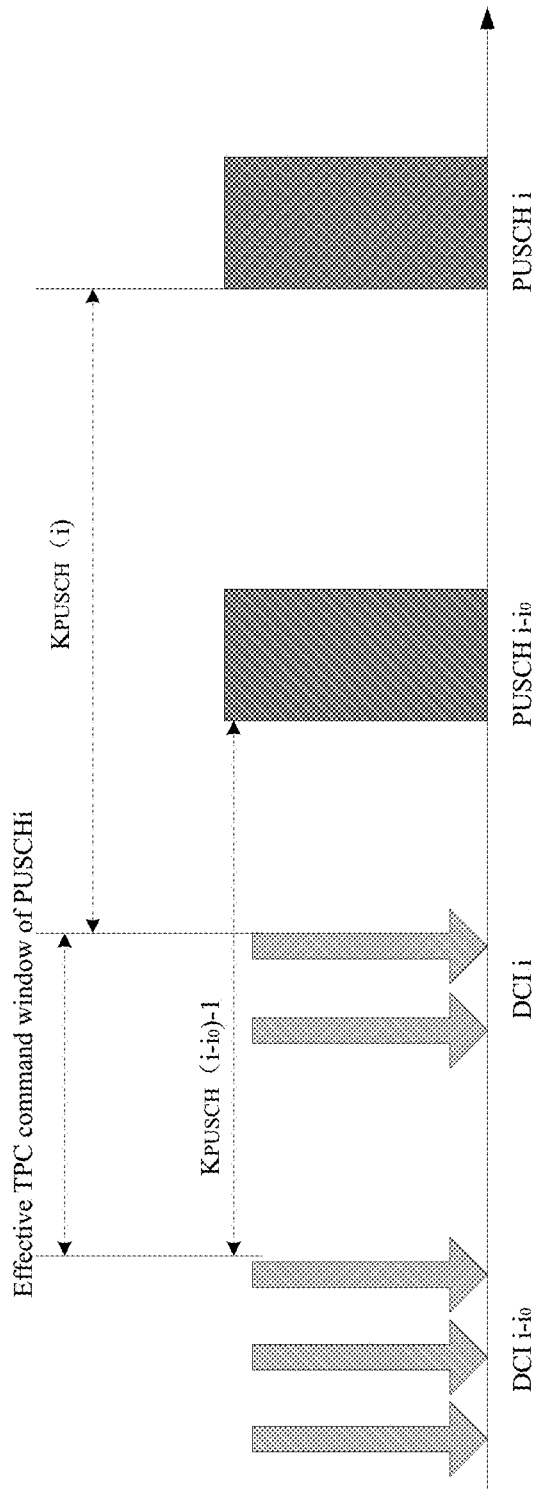
FIG. 15 is a sixth schematic diagram of an implementation of determining the effective TPC command window of the PUSCH in the accumulation mode provided by the embodiment of the present application.
Figure 16:
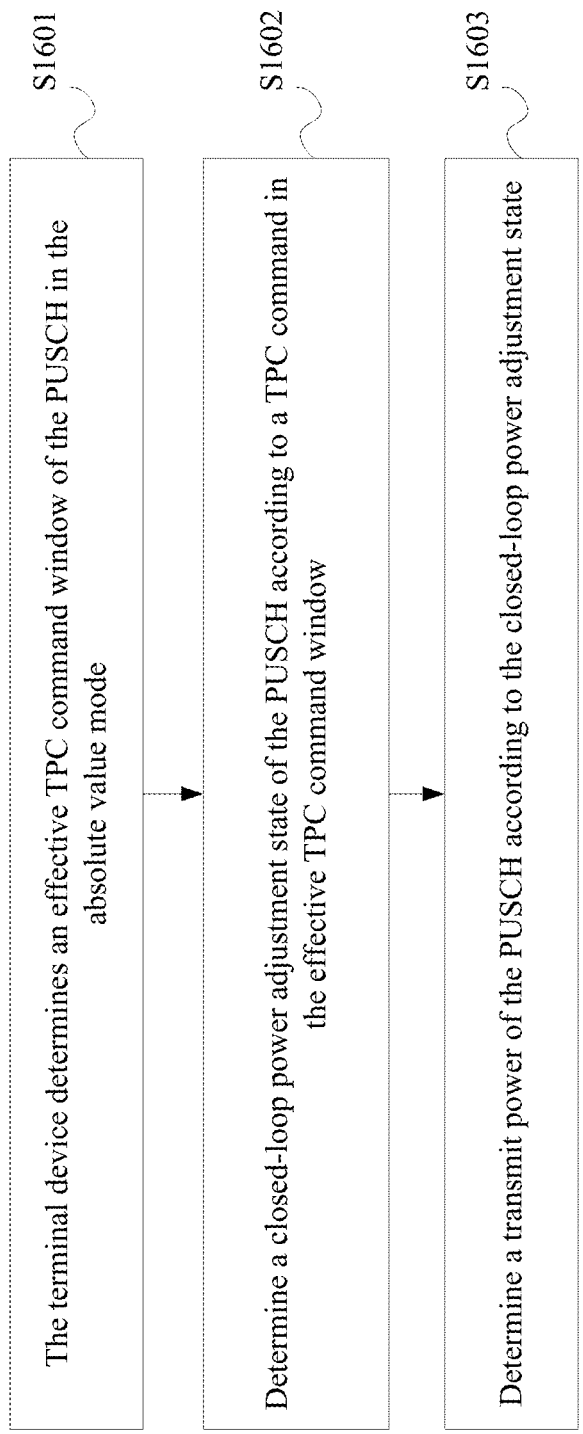
FIG. 16 is a third flowchart of a power control method provided by an embodiment of the present application.

The following describes the implementation manners of uplink power control when the uplink signal is PUSCH and the closed-loop power adjustment state is the accumulation mode with reference to FIGS. 9 to 16. FIG. 9 is a second flowchart of a power control method provided by an embodiment of the present application, FIG. 10 is a first schematic diagram of the implementation of determining the effective TPC command window of the PUSCH in the accumulation mode provided by the embodiment of the present application, FIG. 11 is a second schematic diagram of the implementation of determining the effective TPC command window of the PUSCH in the accumulation mode provided by the embodiment of the present application, FIG. 12 is a third schematic diagram of the implementation of determining the effective TPC command window of PUSCH in the accumulation mode provided by the embodiment of the present application, FIG. 13 is a fourth schematic diagram of the implementation of determining the effective TPC command window of the PUSCH in the accumulation mode provided by the embodiment of the present application, and FIG. 14 is a fifth schematic diagram of the implementation of determining the effective TPC command window of PUSCH in the accumulation mode provided by the embodiment of the present application, FIG. 15 is the sixth schematic diagram of the implementation of determining the effective TPC command window of the PUSCH in the accumulation mode provided by the embodiment of the present application, and FIG. 16 is a schematic diagram of the implementation of determining the effective TPC command of the PUSCH in the accumulation mode provided by the embodiment of the present application.

In S901, the terminal device determines the effective TPC command window of the PUSCH in the accumulation mode.

In the current situation, the first PDCCH is the PDCCH used to schedule the PUSCH, and the second PDCCH is the most recent PDCCH used to schedule PUSCH before the PDCCH used to schedule the PUSCH, then when determining the effective TPC command window, for example, there may be the following possible implementation manners.

In one implementation manner, the plurality of repeatedly transmitted PDCCHs may only include the repeatedly transmitted first PDCCH, that is, the PDCCH that schedules the PUSCH is configured with repeated transmission (repetition).

In the current situation, the window between the first OFDM symbol after the second PDCCH and the last OFDM symbol of the headmost PDCCH in the repeatedly transmitted first PDCCH may be determined as an effective TPC command window.

For example, it can be understood with reference to FIG. 10. As shown in FIG. 10, there is currently $DCI_{i-i_0}$ for scheduling $PUSCH_{i-i_0}$ and there is currently $DCI_i$ for scheduling $PUSCH_i$, $DCI_{i-i_0}$ is the most recent DCI for scheduling PUSCH before $DCI_i$ for scheduling $PUSCH_i$, and PDCCH is used to carry DCI, then $DCI_i$ corresponds to the first PDCCH, and $DCI_{i-i_0}$ corresponds to the second PDCCH.

Among them, $DCI_i$ is repeatedly transmitted twice. With reference to FIG. 10, currently, the window between the first OFDM symbol after $DCI_{i-i_0}$ and the last OFDM symbol of the first (first sent) $DCI_i$ in the repeatedly transmitted $DCI_i$ is determined as the effective TPC command window.

Alternatively, in the current situation, the window between the first OFDM symbol after the second PDCCH and the last OFDM symbol of the last PDCCH in the repeatedly transmitted first PDCCH may also be determined as the effective TPC command window.

For example, it can be understood with reference to FIG. 11. As shown in FIG. 11, the meaning of each parameter is the same as that in FIG. 10, where $DCI_i$ is repeatedly transmitted twice. Referring to FIG. 11, currently, the window between the first OFDM symbol after $DCI_{i-i_0}$ and the last OFDM symbol of the last (last sent) $DCI_i$ in the repeatedly transmitted $DCI_i$ is determined as the effective TPC command window.

In another implementation manner, the plurality of repeatedly transmitted PDCCHs may only include the repeatedly transmitted second PDCCH, that is to say, the PDCCH that schedules the PUSCH most recently before the PDCCH used to schedule the PUSCH is configured with a repeated transmission (repetition).

In the current situation, the window between the first OFDM symbol after the headmost PDCCH in the repeatedly transmitted second PDCCH and the last OFDM symbol of the first PDCCH may be determined as an effective TPC command window.

For example, it can be understood with reference to FIG. 12. As shown in FIG. 12, the meaning of each parameter is the same as that in FIG. 10, where $DCI_{i-i_0}$ is repeatedly transmitted twice. With reference to FIG. 12, the window between the first OFDM symbol after the first (first sent) $DCI_{i-i_0}$ in the repeatedly transmitted $DCI_{i-i_0}$ and the last OFDM symbol of $DCI_i$ is determined as the effective TPC command window.

In the current situation, the window between the first OFDM symbol after the last PDCCH in the repeatedly transmitted second PDCCH and the last OFDM symbol of the first PDCCH may also be determined as an effective TPC command window.

For example, it can be understood with reference to FIG. 13. As shown in FIG. 13, the meaning of each parameter is the same as that in FIG. 10, where $DCI_{i-i_0}$ is repeatedly transmitted twice. With reference to FIG. 13, the window between the first OFDM symbol after the last (last sent) $DCI_{i-i_0}$ in the repeatedly transmitted $DCI_{i-i_0}$ and the last OFDM symbol of $DCI_i$ is determined as the effective TPC command window.

In another implementation manner, the plurality of repeatedly transmitted PDCCHs may include a repeatedly transmitted first PDCCH and a repeatedly transmitted second PDCCH at the same time, that is, both are configured with repetition transmission (repetition).

In the current situation, the window between the first OFDM symbol after the headmost PDCCH in the repeatedly transmitted second PDCCH and the last OFDM symbol of the headmost PDCCH in the repeatedly transmitted first PDCCH may be determined as an effective TPC command window.

For example, it can be understood with reference to FIG. 14. As shown in FIG. 14, the meaning of each parameter is the same as that in FIG. 10, where $DCI_{i-i_0}$ is repeatedly transmitted three times, and $DCI_i$ is repeatedly transmitted twice. With reference to FIG. 14, the window between the first OFDM symbol after the first (first sent) $DCI_{i-i_0}$ in the repeatedly transmitted $DCI_{i-i_0}$ and the last OFDM symbol of the first (first sent) $DCI_i$ in the repeatedly transmitted $DCI_i$ is determined as the effective TPC command window.

In the current situation, the window between the first OFDM symbol after the last PDCCH in the repeatedly transmitted second PDCCH and the last OFDM symbol of the last PDCCH in the repeatedly transmitted first PDCCH may also be determined as the effective TPC command window.

For example, it can be understood with reference to FIG. 15. As shown in FIG. 15, the meaning of each parameter is the same as that in FIG. 10, where $DCI_{i-i_0}$ is repeatedly transmitted three times, and $DCI_i$ is repeatedly transmitted twice. With reference to FIG. 15, the window between the first OFDM symbol after the last (last sent) $DCI_{i-i_0}$ in the repeatedly transmitted $DCI_{i-i_0}$ and the last OFDM symbol of the last (last sent) $DCI_i$ in the repeatedly transmitted $DCI_i$ is determined as the effective TPC command window.

The above has introduced several possible implementation manners for determining the effective TPC command window when the uplink signal is PUSCH in the accumulation mode in conjunction with FIG. 10 to FIG. 14, which can be described as follows.

The window is between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i. If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the PUSCH transmission. If repetition is configured to the corresponding PDCCH, the first PDCCH or the last PDCCH among PDCCH repetitions is applied.

The effective TPC command window is between $K_{PUSCH}(i-i_0)-1$ symbols (i.e., the first OFDM symbol after PDCCH scheduling PUSCH transmission occasion $i-i_0$) before PUSCH transmission occasion $i-i_0$ and $K_{PUSCH}(i)$ symbols (i.e., the last OFDM symbol of PDCCH scheduling PUSCH transmission occasion i) before PUSCH transmission occasion i on active UL BWP b of carrier f of serving cell c for PUSCH power control adjustment state l, where $i_0>0$ is the smallest integer for which $K_{PUSCH}(i-i_0)$ symbols (i.e., the last OFDM symbol of PDCCH scheduling PUSCH transmission occasion $i-i_0$) before PUSCH transmission occasion $i-i_0$ is earlier than $K_{PUSCH}(i)$ symbols (i.e., the last OFDM symbol of PDCCH scheduling PUSCH transmission occasion i) before PUSCH transmission occasion i. If a PUSCH transmission is scheduled by a DCI format, $K_{PUSCH}(i)$ is a number of symbols after a last symbol of a corresponding PDCCH reception and before a first symbol of the PUSCH transmission. If repetition is configured to the corresponding PDCCH, the first PDCCH or the last PDCCH among PDCCH repetitions is applied.

That is to say, if the PDCCH used to determine the effective TPC command window is configured with repeated transmission, the headmost PDCCH (the first sent PDCCH) or the last PDCCH (the last sent PDCCH) in the repeatedly transmitted PDCCH is used to determine the effective TPC command window.

And in this embodiment, when the terminal device determines the TPC effective command window, it needs to determine the second PDCCH, and then it needs to determine whether a PDCCH is the PDCCH that schedules another PUSCH most recently before the PDCCH that schedules the PUSCH. If neither the PDCCH that schedules the PUSCH nor the PDCCH that schedules another PUSCH most recently is configured with repeated transmission, the determination can be made directly.

However, if the PDCCH that schedules the PUSCH or the PDCCH that schedules another PUSCH most recently is configured with repeated transmission, the terminal needs to determine one PDCCH from the plurality of repeatedly transmitted PDCCHs for the above determination process.

For example, the terminal device may use the first sent PDCCH or the last sent PDCCH among the plurality of repeatedly transmitted PDCCHs for the above determination.

In a possible implementation manner, if the PDCCH that schedules another PUSCH most recently before the PDCCH scheduling the PUSCH is one PDCCH among the plurality of repeatedly transmitted PDCCHs, that is, it is configured with repeated transmission, for example, the above determination may be made according to the last PDCCH among the plurality of repeatedly transmitted PDCCHs. If the last PDCCH is before the first PDCCH, it can be determined that the PDCCH can be used as the second PDCCH for determining the effective TPC command window; otherwise, the PDCCH cannot be used to determine the effective TPC command window, and the terminal needs to set other PDCCH that satisfies the condition as the second PDCCH.

Alternatively, the above determination can also be made according to the headmost PDCCH among the plurality of repeatedly transmitted PDCCHs, then it only needs to be determined that the headmost PDCCH is before the first PDCCH, that is, any PDCCH of the plurality of repeatedly transmitted PDCCHs is before the first PDCCH, then it can be used as the second PDCCH to determine the effective TPC command window.

In another possible implementation manner, if the plurality of repeatedly transmitted PDCCHs include the repeatedly transmitted first PDCCH, that is, the first PDCCH is configured with repeated transmission, then for example, the above determination may be made according to the headmost PDCCH in the first PDCCH, and then it is only necessary to determine that the second PDCCH is a PDCCH that schedules an uplink signal of the same type most recently before the headmost PDCCH in the repeatedly transmitted first PDCCHs.

Alternatively, the above determination can be made according to the last PDCCH in the repeatedly transmitted first PDCCH, then it is only necessary to determine that the second PDCCH is the PDCCH that schedules the same type of uplink signal before the last PDCCH in the repeatedly transmitted first PDCCH. That is to say, the second PDCCH only needs to precede any one of the repeatedly transmitted first PDCCHs.

In S902, the closed-loop power adjustment state of the PUSCH is determined according to the TPC command in the effective TPC command window.

In this embodiment, the effective TPC command window includes a TPC command. In the accumulation mode, the adjustment values indicated by the TPC command in the TPC command window need to be accumulated to determine the closed-loop power adjustment state of the PUSCH. However, if one TPC command is carried by a plurality of repeatedly transmitted PDCCHs, the terminal device needs to determine whether the TPC command is in the effective TPC command window, that is, it needs to determine whether the current TPC command can be used to determine the closed-loop power adjustment state.

In this embodiment, the TPC command carried by a plurality of repeatedly transmitted PDCCHs is referred to as the first TPC command, then it can be determined whether the first TPC command is in the effective TPC command window according to whether a third PDCCH is in the effective TPC command window, where the third PDCCH is the headmost PDCCH among the plurality of repeatedly transmitted PDCCHs used for carrying the first TPC command, or the third PDCCH is the last PDCCH among the plurality of repeatedly transmitted PDCCHs used for carrying the first TPC command, or, the third PDCCH is any one PDCCH among the plurality of repeatedly transmitted PDCCHs used for carrying the first TPC command.

In a possible implementation manner, if the third PDCCH is in the effective TPC command window, it is determined that the first TPC command is in the effective TPC command window. Then the current first TPC command can be used to determine the closed-loop power adjustment state. Specifically, the adjustment value indicated by the first TPC command, the adjustment value indicated by the TPC command other than the first TPC command in the effective TPC command window, and the previous closed-loop power adjustment state are added to obtain the current closed-loop power adjustment state.

For example, it can be understood by referring to the following formula 6:

$$f_{b,f,c}(i,l)=f_{b,f,c}(i-i_0,l)+\Sigma_{m=0}^{\varsigma(D_i)-1}\delta_{PUSCH,b,f,c(m,l)} \quad \text{formula 6}$$

where $f_{b,f,c}(i-i_0,l)$ is the previous closed-loop power adjustment state, $f_{b,f,c}(i,l)$ is the current closed-loop power adjustment state, $\delta_{PUSCH,b,f,c}(m,l)$ is the adjustment value indicated by the TPC command in the effective TPC command window, and $D_i$ is the TPC command in the effective TPC command window.

In another possible implementation manner, if the third PDCCH is not in the effective TPC command window, it is determined that the first TPC command is not in the effective TPC command window. Then the current first TPC command is not used to determine the closed-loop power adjustment state.

That is to say, if one TPC command is carried by a plurality of repeatedly transmitted PDCCHs, when determining whether the TPC command can be used for closed-loop power adjustment, the terminal device performs the determination according to whether the first sent PDCCH (i.e. the headmost PDCCH) is within the effective TPC command window, or whether the last sent PDCCH (i.e., the last PDCCH) is within the effective TPC command window. Alternatively, as long as any one of the PDCCHs is within the effective TPC command window, the TPC command can be used to determine the closed-loop power adjustment state.

It can be described as follows:

$f_{b,f,c}(i,l)=f_{b,f,c}(i-i_0,l)+\Sigma_{m=0}^{\varsigma(D_i)-1}\delta_{PUSCH,b,f,c(m,l)}$ is the PUSCH power control adjustment state l for active UL BWP b of carrier f of serving cell c and PUSCH transmission occasion i if the UE is not provided tpc-Accumulation, where the $\delta_{PUSCH,b,f,c}$ values are given in Table 7.1.1-1. $\Sigma_{m=0}^{\varsigma(D_i)-1}\delta_{PUSCH,b,f,c(m,l)}$ is a sum of TPC command values in a set $D_i$ of TPC command values with cardinality $\varsigma(D_i)$ that the UE receives between $K_{PUSCH}(i-i_0)$ 1 symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}$ (i) symbols before PUSCH transmission occasion i. If repetition is configured to the PDCCH carrying TPC command, only the first PDCCH or the last PDCCH among PDCCH repetitions is applied for calculation of $\delta_{PUSCH,b,f,c(m,l)}$, or is applied to determine whether the TPC command is accumulated.

If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the PUSCH transmission. If repetition is configured to the corresponding PDCCH, the first PDCCH or the last PDCCH among PDCCH repetitions is applied.

$f_{b,f,c}(i,l)=f_{b,f,c}(i-i_0,l)+\Sigma_{m=0}^{\varsigma(D_i)-1}\delta_{PUSCH,b,f,c(m,l)}$ is the PUSCH power control adjustment state l for active UL BWP b of carrier f of serving cell c and the closed-loop power control adjustment state corresponding to PUSCH transmission occasion i if the UE is provided TPC accumulation mode, where the $\delta_{PUSCH,b,f,c}$ values are given in Table 7.1.1-1. $\Sigma_{m=0}^{\varsigma(D_i)-1}\delta_{PUSCH,b,f,c(m,l)}$ is a sum of command values indicated by the TPC command in a set $D_i$ of TPC command values with cardinality $\varsigma(D_i)$ that is a TPC command received by the UE between $K_{PUSCH}(i-i_0)-1$ symbols (i.e., the first OFDM symbol after PDCCH scheduling PUSCH transmission occasion $i-i_0$) before PUSCH transmission occasion $i-i_0$ and $K_{PUSCH}$ (i) symbols (i.e., the last OFDM symbol of PDCCH scheduling PUSCH transmission occasion i) before PUSCH transmission occasion i for PUSCH power control adjustment state l, where $i_0>0$ is the smallest integer for which $K_{PUSCH}(i-i_0)$ symbols (i.e., the last OFDM symbol of PDCCH scheduling PUSCH transmission occasion $i-i_0$) before PUSCH transmission occasion $i-i_0$ is earlier than $K_{PUSCH}$ (i) symbols (i.e., the last OFDM symbol of PDCCH scheduling PUSCH transmission occasion i) before PUSCH transmission occasion i. If repetition is configured to the PDCCH carrying TPC command, only the headmost PDCCH or the last PDCCH among PDCCH repetitions is applied for calculation of $\Sigma_{m=0}^{\varsigma(D_i)-1}\delta_{PUSCH,b,f,c(m,l)}$, or is applied to determine whether the TPC command is accumulated.

If a PUSCH transmission is scheduled by a DCI format, $K_{PUSCH}(i)$ is a number of symbols after a last symbol of a corresponding PDCCH reception and before a first symbol of the PUSCH transmission. If repetition is configured to the corresponding PDCCH, the headmost PDCCH or the last PDCCH among PDCCH repetitions is applied.

In S903, the transmit power of the PUSCH is determined according to the closed-loop power adjustment state.

After the closed-loop power adjustment state of the PUSCH is determined, the transmit power of the PUSCH can be determined according to the processing method of the accumulation mode described in the above-mentioned embodiment. Its specific implementation manner may refer to the introduction of the above embodiments, and will not be repeated here.

In the power control method provided by the embodiment of the present application, when the PDCCH scheduling the uplink signal or the PDCCH carrying the TPC command of the uplink signal is repeatedly transmitted, the terminal device may determine one reference PDCCH from the plurality of PDCCHs scheduling the uplink signal to obtain the effective window of TPC, or the terminal device may determine one reference PDCCH from the plurality of PDCCHs carrying the TPC command to determine whether the TPC is within the effective window, so that the accuracy of the closed-loop power control of the PUSCH can be effectively guaranteed in the accumulation mode.

The above embodiment describes an implementation manner in which the closed-loop power adjustment state is an accumulation mode. In another possible implementation manner, the closed-loop power adjustment state may also be an absolute value mode. For example, the network device configures the current closed-loop power control state as the absolute value mode through high-layer signaling.

The following describes the implementation manners of uplink power control when the uplink signal is PUSCH and the closed-loop power adjustment state is the absolute value mode with reference to FIG. 16. FIG. 16 is a third flowchart of a power control method provided by an embodiment of the present application.

As shown in FIG. 16, the method includes the following steps.

In S1601, the terminal device determines an effective TPC command window of the PUSCH in the absolute value mode.

In this embodiment, the PUSCH can be scheduled by high-layer signaling. In the current situation, when determining the effective TPC command window, the window before the preset number of symbols before the uplink signal can be determined as the effective TPC command window, where the preset number is the number of OFDM symbols in one slot multiplied by a first value, and the first value is configured by radio resource control (RRC) signaling.

For example, the window before $K_{PUSCH, min}$ symbols of PUSCH can be used as the effective TPC command window, where $K_{PUSCH, min}$ is equal to the number of OFDM symbols in one slot multiplied by a first value $k_2$, and $k_2$ is the value configured by RRC signaling.

For example, the number of OFDM symbols in one slot is 14, and $k_2$ is the minimum value among the $k_2$ values configured in the high-layer signaling PUSCH-ConfigCommon. That is to say, only the TPC command sent before $K_{PUSCH, min}$ symbols can be used to determine the closed-loop power adjustment state of the PUSCH.

In S1602, the closed-loop power adjustment state of the PUSCH is determined according to the TPC command in the effective TPC command window.

In this embodiment, in the absolute value mode, the closed-loop power adjustment state of the PUSCH needs to be determined according to the last TPC command in the effective TPC command window. However, if the last TPC command is carried by a plurality of PDCCHs transmitted repeatedly, the terminal device needs to determine whether the last TPC command can be used to determine the closed-loop power adjustment state.

In this embodiment, the last TPC command in the effective TPC command window is called the second TPC command. If the second TPC command is carried by a plurality of repeatedly transmitted PDCCHs, then according to whether a fourth PDCCH is in the effective TPC command window, it is determined whether the second TPC command can be used to determine the closed-loop power adjustment state, where the fourth PDCCH is the headmost PDCCH among the plurality of repeatedly transmitted PDCCHs used to carry the second TPC command, or the fourth PDCCH is the last PDCCH among the plurality of repeatedly transmitted PDCCHs used to carry the second TPC command, or the fourth PDCCH is any one of the plurality of repeatedly transmitted PDCCHs used to carry the second TPC command.

In a possible implementation manner, if the fourth PDCCH is in the effective TPC command window, it is determined that the second TPC command can be used to determine the closed-loop power adjustment state. Specifically, the adjustment value indicated by the second TPC command may be determined as the current closed-loop power adjustment state.

In another possible implementation manner, if the fourth PDCCH is not in the effective TPC command window, it is determined that the second TPC command is not used to determine the closed-loop power adjustment state. At this time, the terminal device needs to use another TPC command of the corresponding fourth PDCCH in the effective TPC command window to determine the closed-loop power adjustment state.

Alternatively, if one TPC command is carried by a plurality of repeatedly transmitted PDCCHs, it can also be determined whether the TPC command is in the effective TPC command window according to whether the headmost PDCCH or the last PDCCH in the plurality of PDCCHs is in the effective TPC command window, and its implementation manner is similar to that described above, and will not be repeated here.

After the determination is completed, the closed-loop public power adjustment state is determined according to the last TPC command in the effective TPC command window.

That is to say, if one TPC command is carried by a plurality of repeatedly transmitted PDCCHs, when the terminal device determines whether the TPC command is the last TPC command in the effective TPC command window and whether it can be used for closed-loop power adjustment, the determination is made according to the PDCCH sent first, or the determination is made according to the PDCCH sent last. Alternatively, as long as any one of the PDCCHs is within the effective TPC command window, the TPC command can be used to determine the closed-loop power adjustment state.

In S1603, the transmit power of the PUSCH is determined according to the closed-loop power adjustment state.

After the closed-loop power adjustment state of the PUSCH is determined, the transmit power of the PUSCH can be determined according to the processing method of the absolute value mode introduced in the above-mentioned embodiment. Its specific implementation manner may refer to the introduction of the above embodiments, and will not be repeated here.

In the power control method provided by the embodiment of the present application, when the PDCCH scheduling the uplink signal or the PDCCH carrying the TPC command of the uplink signal is repeatedly transmitted, the terminal device may determine one reference PDCCH from the plurality of PDCCHs scheduling the uplink signal to obtain the effective window of TPC, or the terminal device may determine one reference PDCCH from the plurality of PDCCHs carrying the TPC command to determine whether the TPC is within the effective window, so that the accuracy of the closed-loop power control of the PUSCH can be effectively guaranteed in the absolute value mode.

The above describes various possible implementation manners in which the uplink signal is PUSCH, and next, various possible implementation manners in which the uplink signal is PUCCH are introduced.

In a possible implementation manner, the closed-loop power adjustment state may be an accumulation mode, for example, the network device configures the current closed-loop power control state of the terminal device to be an accumulation mode through high-layer signaling.

Figure 17:
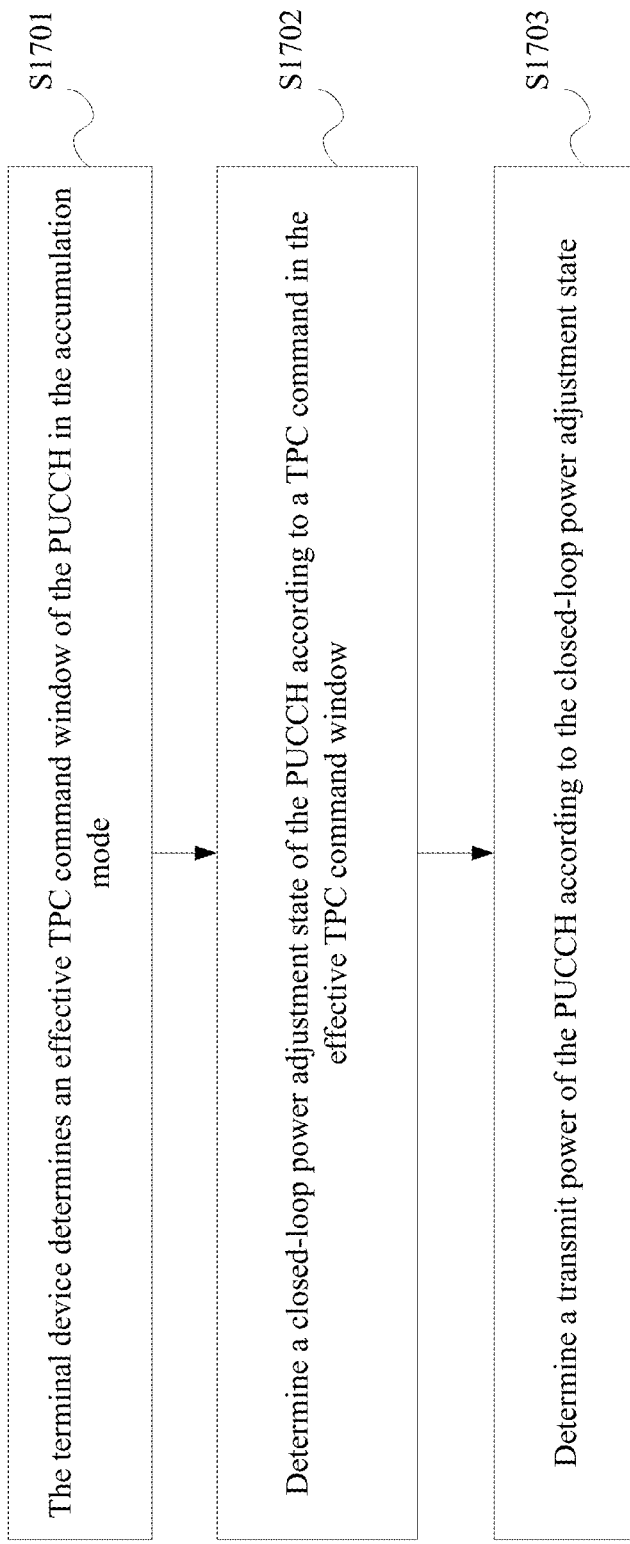
FIG. 17 is a fourth flowchart of a power control method provided by an embodiment of the present application.
Figure 18:
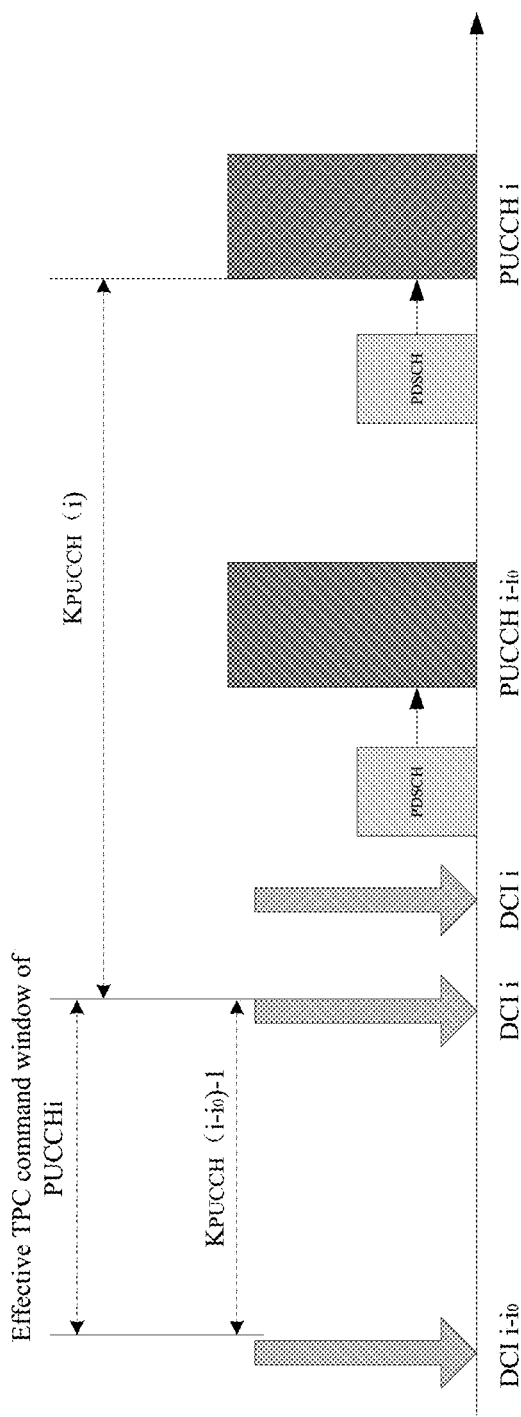
FIG. 18 is a first schematic diagram of an implementation of determining an effective TPC command window of a PUCCH in an accumulation mode provided by an embodiment of the present application.
Figure 19:
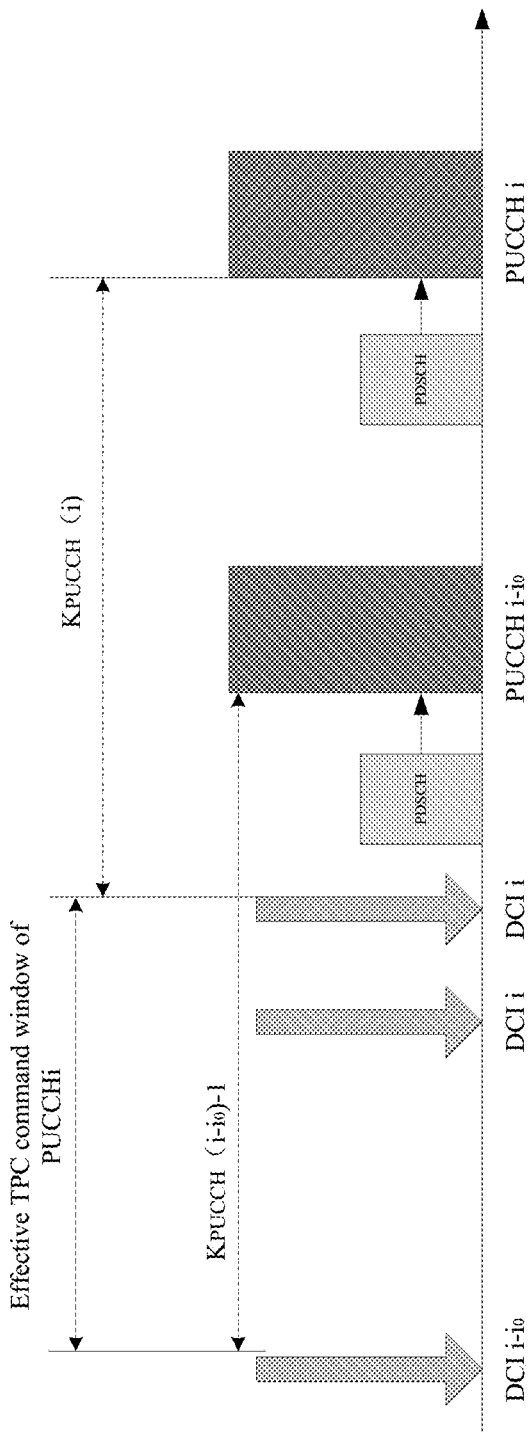
FIG. 19 is a second schematic diagram of the implementation of determining the effective TPC command window of the PUCCH in the accumulation mode provided by the embodiment of the present application.
Figure 20:
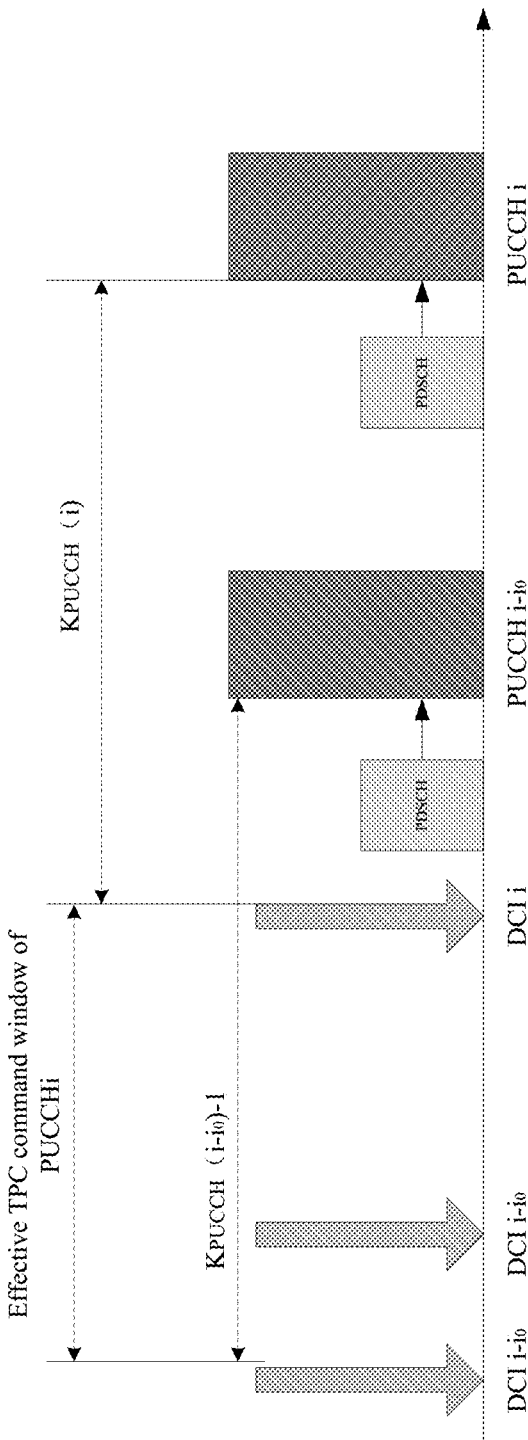
FIG. 20 is a third schematic diagram of the implementation of determining the effective TPC command window of the PUCCH in the accumulation mode provided by the embodiment of the present application.
Figure 21:
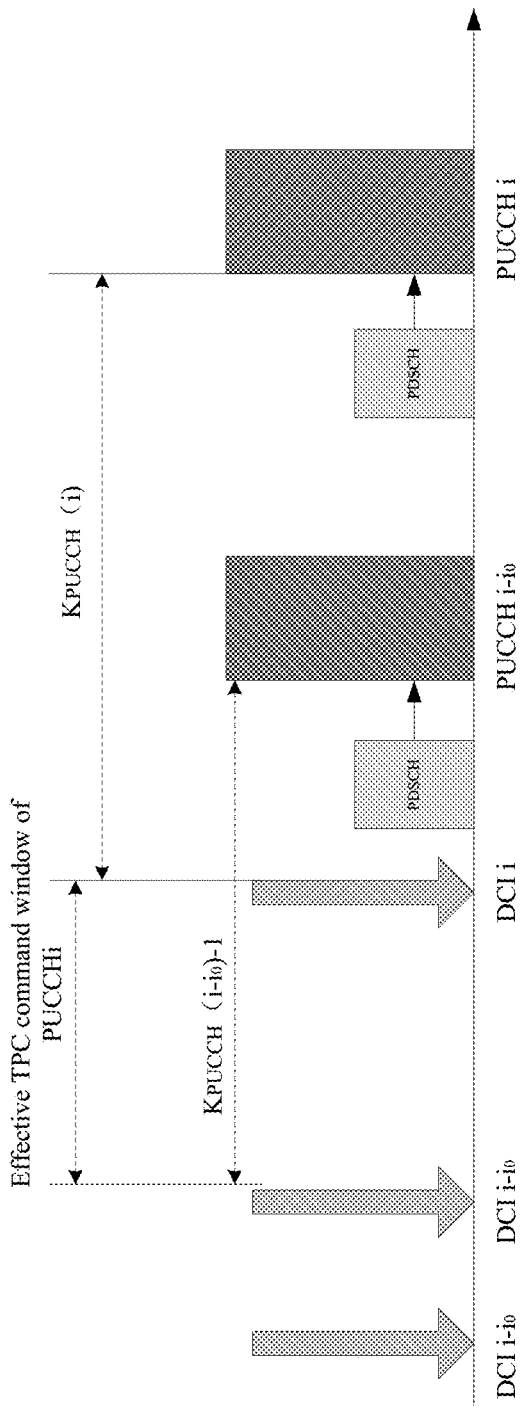
FIG. 21 is a fourth implementation diagram of the implementation of determining the effective TPC command window of the PUCCH in the accumulation mode provided by the embodiment of the present application.
Figure 22:
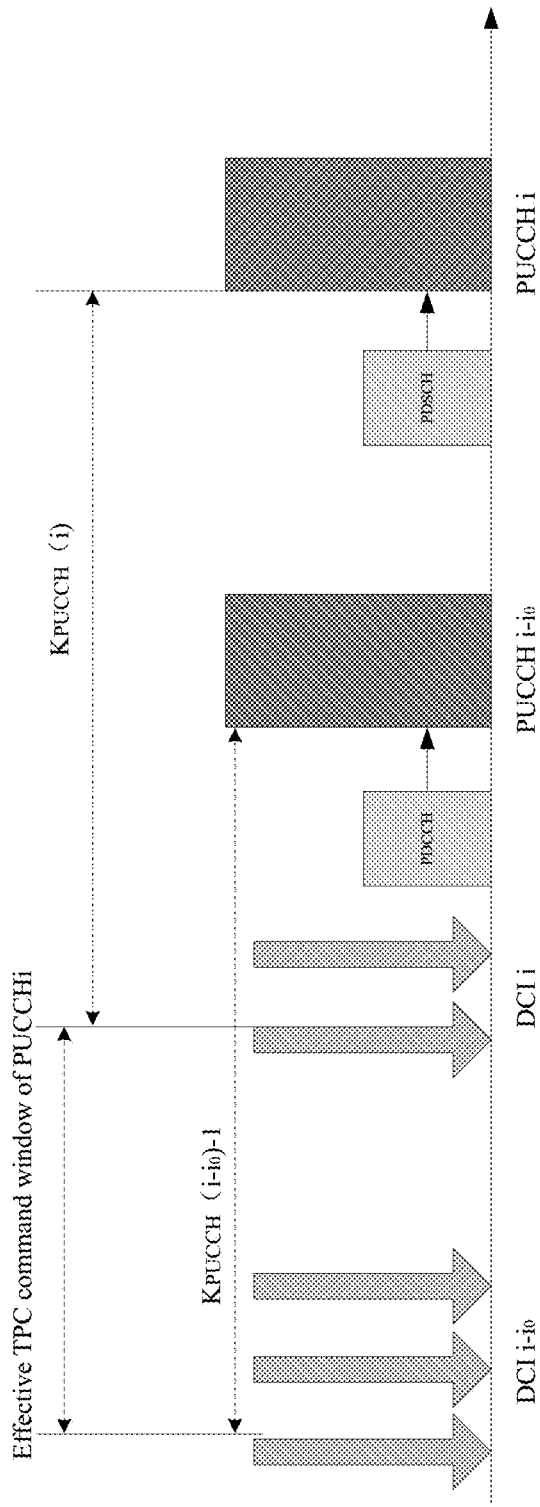
FIG. 22 is a fifth schematic diagram of the implementation of determining the effective TPC command window of the PUCCH in the accumulation mode provided by the embodiment of the present application.
Figure 23:
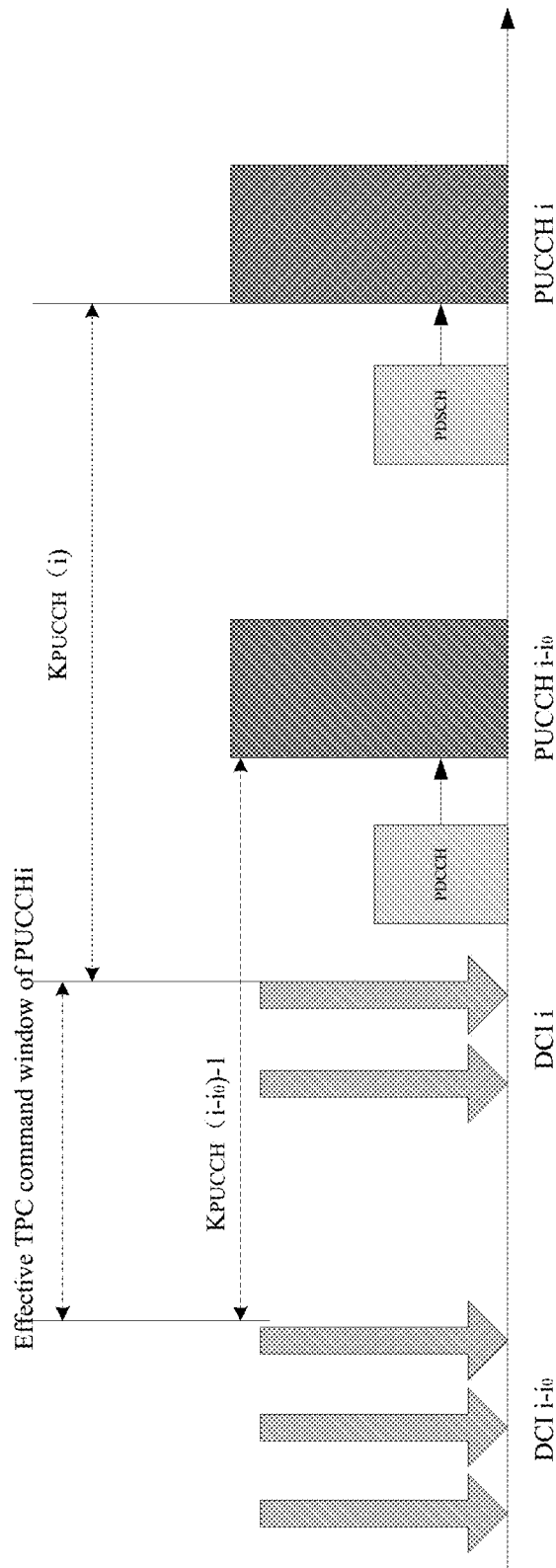
FIG. 23 is a sixth schematic diagram of the implementation of determining the effective TPC command window of the PUCCH in the accumulation mode provided by the embodiment of the present application.

The implementation manners of uplink power control in a case that the uplink signal is PUCCH and the closed-loop power adjustment state is the accumulation mode will be introduced in combination with FIG. 17 to FIG. 23. FIG. 17 is a fourth flowchart of the power control method provided by the embodiment of the application. FIG. 18 is a first schematic diagram of the implementation of determining an effective TPC command window of PUCCH in an accumulation mode provided by an embodiment of the present application. FIG. 19 is a second schematic diagram of the implementation of determining an effective TPC command window of PUCCH in the accumulation mode provided by an embodiment of the present application. FIG. 20 is a third schematic diagram of the implementation of determining the effective TPC command window of the PUCCH in the accumulation mode provided by the embodiment of the present application. FIG. 21 is a fourth schematic diagram of the implementation of determining the effective TPC command window of the PUCCH in the accumulation mode provided by the embodiment of the application. FIG. 22 is a fifth schematic diagram of the implementation of determining the effective TPC command window of the PUCCH in the accumulation mode provided by the embodiment of the application. FIG. 23 is a sixth schematic diagram of the implementation of determining the effective TPC command window of the PUCCH in the accumulation mode provided by the embodiment of the application.

In S1701, the terminal device determines the effective TPC command window of the PUCCH in the accumulation mode.

In this embodiment, if one PDCCH schedules one PUCCH, the PUCCH carries HARQ-ACK information corresponding to the PDSCH scheduled by the PDCCH, and the resource of the PUCCH is indicated by the PDCCH.

In the current situation, the first PDCCH is the PDCCH used to schedule the PUCCH, and the second PDCCH is the PDCCH scheduling the PUCCH most recently before the PDCCH used to schedule the PUCCH. When determining the effective TPC command window, for example, there may be the following possible implementation manners.

In one implementation manner, the plurality of repeatedly transmitted PDCCHs may only include the repeatedly transmitted first PDCCH, that is, the PDCCH that schedules the PUCCH is configured with repeated transmission (repetition).

In the current situation, the window between the first OFDM symbol after the second PDCCH and the last OFDM symbol of the headmost PDCCH in the repeatedly transmitted first PDCCH may be determined as an effective TPC command window.

For example, it can be understood with reference to FIG. 18. As shown in FIG. 18, there is currently $DCI_{i-i_0}$ for scheduling $PUCCH_{i-i_0}$ and there is currently $DCI_i$ for scheduling $PUCCH_i$, $DCI_{i-i_0}$ is the most recent DCI for scheduling PUCCH before $DCI_i$ for scheduling $PUCCH_i$, and PDCCH is used to carry DCI, then $DCI_i$ corresponds to the first PDCCH, and $DCI_{i-i_0}$ corresponds to the second PDCCH.

$DCI_i$ is repeatedly transmitted twice. Referring to FIG. 18, currently, the window between the first OFDM symbol after $DCI_{i-i_0}$ and the last OFDM symbol of the first (first sent)

$DCI_i$ in the repeatedly transmitted $DCI_i$ is determined as the effective TPC command window.

Alternatively, in the current situation, the window between the first OFDM symbol after the second PDCCH and the last OFDM symbol of the last PDCCH in the repeatedly transmitted first PDCCH may also be determined as the effective TPC command window.

For example, it can be understood with reference to FIG. 19. As shown in FIG. 19, the meaning of each parameter is the same as that in FIG. 18, where $DCI_i$ is repeatedly transmitted twice. Referring to FIG. 19, currently, the window between the first OFDM symbol after $DCI_{i-i_0}$ and the last OFDM symbol of the last (last sent) $DCI_i$ in the repeatedly transmitted $DCI_i$ is determined as the effective TPC command window.

In another implementation manner, the plurality of repeatedly transmitted PDCCHs may only include a repeatedly transmitted second PDCCH, that is, the PDCCH scheduling PUCCH most recently before the PDCCH used to schedule the PUCCH is configured with repeated transmission (repetition).

In the current situation, the window between the first OFDM symbol after the headmost PDCCH in the repeatedly transmitted second PDCCH and the last OFDM symbol of the first PDCCH may be determined as an effective TPC command window.

For example, it can be understood with reference to FIG. 20. As shown in FIG. 20, the meaning of each parameter is the same as that in FIG. 18, where $DCI_{i-i_0}$ is repeatedly transmitted twice. With reference to FIG. 20, currently, the window between the first OFDM symbol after the first (first sent) $DCI_{i-i_0}$ in the repeatedly transmitted $DCI_{i-i_0}$ and the last OFDM symbol of $DCI_i$ is determined as the effective TPC command window.

In the current situation, the window between the first OFDM symbol after the last PDCCH in the repeatedly transmitted second PDCCH and the last OFDM symbol of the first PDCCH may also be determined as the effective TPC command window.

For example, it can be understood with reference to FIG. 21. As shown in FIG. 21, the meaning of each parameter is the same as that of FIG. 18, where $DCI_{i-i_0}$ is repeatedly transmitted twice. With reference to FIG. 22, currently, the window between the first OFDM symbol after the last (last sent) $DCI_{i-i_0}$ in the repeatedly transmitted $DCI_{i-i_0}$ and the last OFDM symbol of $DCI_i$ may be determined as the effective TPC command window.

In another implementation manner, the plurality of repeatedly transmitted PDCCHs may include a repeatedly transmitted first PDCCH and a repeatedly transmitted second PDCCH at the same time, that is, both are configured with repetition transmission (repetition).

In the current situation, the window between the first OFDM symbol after the headmost PDCCH in the repeatedly transmitted second PDCCH and the last OFDM symbol of the headmost PDCCH in the repeatedly transmitted first PDCCH may be determined as the effective TPC command window.

For example, it can be understood with reference to FIG. 22. As shown in FIG. 22, the meaning of each parameter is the same as that in FIG. 18, where $DCI_{i-i_0}$ is repeatedly transmitted three times, and $DCI_i$ is repeatedly transmission twice. With reference to FIG. 22, currently, the window between the first OFDM symbol after the first (first sent) $DCI_{i-i_0}$ in the repeatedly transmitted $DCI_{i-i_0}$ and the last OFDM symbol of the first (first sent) $DCI_i$ in the repeatedly transmitted $DCI_i$ may be determined as the effective TPC command window.

In the current situation, the window between the first OFDM symbol after the last PDCCH in the repeatedly transmitted second PDCCH and the last OFDM symbol of the last PDCCH in the repeatedly transmitted first PDCCH can also be determined as the effective TPC command window.

For example, it can be understood with reference to FIG. 23. As shown in FIG. 23, the meaning of each parameter is the same as that of FIG. 18, where $DCI_{i-i_0}$ is repeatedly transmitted three times, and $DCI_i$ is repeatedly transmission twice. With reference to FIG. 23, currently, the window between the first OFDM symbol after the last (last sent) $DCI_{i-i_0}$ in the repeatedly transmitted $DCI_{i-i_0}$ and the last OFDM symbol of the last (last sent) $DCI_i$ in the repeatedly transmitted $DCI_i$ may be determined as the effective TPC command window.

The above has introduced several possible implementation manners for determining the effective TPC command window when the uplink signal is PUCCH in the accumulation mode in conjunction with FIG. 18 to FIG. 23, which can be described as follows:

The window is between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of serving cell c for PUCCH power control adjustment state, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i. If the PUCCH transmission is in response to a detection by the UE of a DCI format, $K_{PUCCH}(i)$ is a number of symbols for active UL BWP b of carrier f of serving cell c after a last symbol of a corresponding PDCCH reception and before a first symbol of the PUCCH transmission. If repetition is configured to the corresponding PDCCH, the first PDCCH or the last PDCCH among PDCCH repetitions is applied.

(The effective TPC command window is between $K_{PUCCH}(i-i_0)-1$ symbols (i.e., the first OFDM symbol after PDCCH scheduling PUSCH transmission occasion $i-i_0$) before PUCCH transmission occasion $i-i_0$ and $K_{PUCCH}(i)$ symbols (i.e., the last OFDM symbol of PDCCH scheduling PUSCH transmission occasion i) before PUCCH transmission occasion i on active UL BWP b of carrier f of serving cell c for PUCCH power control adjustment state l, where $i_0>0$ is the smallest integer for which $K_{PUCCH}(i-i_0)$ symbols (i.e., the last OFDM symbol of PDCCH scheduling PUSCH transmission occasion $i-i_0$) before PUCCH transmission occasion $i-i_0$ is earlier than $K_{PUCCH}(i)$ symbols (i.e., the last OFDM symbol of PDCCH scheduling PUSCH transmission occasion i) before PUCCH transmission occasion i. If the PUCCH transmission is scheduled by a DCI format, $K_{PUCCH}(i)$ is a number of symbols after a last symbol of a corresponding PDCCH reception and before a first symbol of the PUCCH transmission. If repetition is configured to the corresponding PDCCH, the headmost PDCCH or the last PDCCH among PDCCH repetitions is applied.)

That is to say, if the PDCCH used to determine the effective TPC command window is configured with repeated transmission, the headmost PDCCH (the first sent PDCCH) or the last PDCCH (the last sent PDCCH) in the repeatedly transmitted PDCCH is used to determine the effective TPC command window.

And in this embodiment, when the terminal device determines the TPC effective command window, it needs to determine the second PDCCH, and then it needs to determine whether a PDCCH is the PDCCH that schedules another PUCCH most recently before the PDCCH that schedules the PUCCH. If neither the PDCCH that schedules the PUCCH nor the PDCCH that schedules another PUCCH most recently is configured with repeated transmission, the determination may be directly made.

However, if the PDCCH that schedules the PUCCH or the PDCCH that schedules another PUCCH most recently is configured with repeated transmission, the terminal needs to determine one PDCCH from the plurality of repeatedly transmitted PDCCHs for the above determination process.

For example, the terminal device may use the first sent PDCCH or the last sent PDCCH among the plurality of repeatedly transmitted PDCCHs for the above determination.

In a possible implementation manner, if the PDCCH that schedules another PUCCH most recently before the PDCCH that schedules the PUCCH is one PDCCH among a plurality of repeatedly transmitted PDCCHs, that is, it is configured with repeated transmission, for example, the above determination may be made according to the last PDCCH among the plurality of repeatedly transmitted PDCCHs. If the last PDCCH is before the first PDCCH, it can be determined that this PDCCH can be used as the second PDCCH to determine the effective TPC command window; otherwise, this PDCCH cannot be used to determine the effective TPC command window, and the terminal needs to set other PDCCH that satisfies the condition as the second PDCCH.

Alternatively, the above determination can also be made according to the headmost PDCCH among the plurality of repeatedly transmitted PDCCHs, then it only needs to be determined that the headmost PDCCH is before the first PDCCH, that is, any one PDCCH in the plurality of repeatedly transmitted PDCCHs before the first PDCCH can be used as the second PDCCH to determine the effective TPC command window.

In another possible implementation manner, if the plurality of repeatedly transmitted PDCCHs include the repeatedly transmitted first PDCCH, that is, the first PDCCH is configured with repeated transmission, then for example, the above determination may be made according to the headmost PDCCH in the repeatedly transmitted first PDCCHs, and then it is only necessary to determine that the second PDCCH is a PDCCH that schedules an uplink signal of the same type most recently before the headmost PDCCH in the repeatedly transmitted first PDCCHs.

Alternatively, the above determination may be made according to the last PDCCH in the repeatedly transmitted first PDCCH, then it is only necessary to determine that the second PDCCH is the PDCCH that schedules the same type of uplink signal before the last PDCCH in the repeatedly transmitted first PDCCH. That is to say, the second PDCCH only needs to precede any one of the repeatedly transmitted first PDCCH.

In S1702, the closed-loop power adjustment state of the PUCCH is determined according to the TPC command in the effective TPC command window.

In this embodiment, the effective TPC command window includes a TPC command. In the accumulation mode, the adjustment values indicated by the TPC command in the TPC command window need to be accumulated to determine the closed-loop power adjustment state of the PUCCH. However, if one TPC command is carried by a plurality of repeatedly transmitted PDCCHs, then the terminal device needs to determine whether the TPC command is in the effective TPC command window, that is, it needs to determine whether the current TPC command can be used to determine the closed-loop power adjustment state.

In this embodiment, the TPC command carried by the plurality of repeatedly transmitted PDCCHs is referred to as the first TPC command, then it may be determined whether the first TPC command is in the effective TPC command window according to whether a third PDCCH is in the effective TPC command window, where the third PDCCH is the headmost PDCCH among the plurality of repeatedly transmitted PDCCHs used for carrying the first TPC command, or the third PDCCH is the last PDCCH among the plurality of repeatedly transmitted PDCCHs used for carrying the first TPC command, or, the third PDCCH is any one PDCCH among the plurality of repeatedly transmitted PDCCHs used for carrying the first TPC command.

In a possible implementation manner, if the third PDCCH is in the effective TPC command window, it is determined that the first TPC command is in the effective TPC command window.

Then the current first TPC command can be used to determine the closed-loop power adjustment state. Specifically, the adjustment value indicated by the first TPC command, the adjustment value indicated by the TPC command other than the first TPC command in the effective TPC command window, and the previous closed-loop power adjustment state are added to obtain the current closed-loop power adjustment state.

For example, it can be understood by referring to the following formula 7, $$g_{b,f,c}(i,l) = g_{b,f,c}(i-i_0,l) + \Sigma_{m=0}^{\varsigma(C_i)-1} \delta_{PUCCH,b,f,c(m,l)} \quad \text{formula 7,}$$

where $g_{b,f,c}(i-i_0,l)$ is the previous closed-loop power adjustment state, $g_{b,f,c}(i,l)$ is the current closed-loop power adjustment state, $\delta_{PUCCH,b,f,c(m,l)}$ is the adjustment value indicated by the TPC command in the effective TPC command window, and $C_i$ is the TPC command in the effective TPC command window.

In another possible implementation manner, if the third PDCCH is not in the effective TPC command window, it is determined that the first TPC command is not in the effective TPC command window. Then the current first TPC command is not used to determine the closed-loop power adjustment state.

That is to say, if one TPC command is carried by a plurality of repeatedly transmitted PDCCHs, when the terminal device determines whether the TPC command can be used for closed-loop power adjustment, the determination is made according to whether the first sent PDCCH (i.e. the headmost PDCCH) is in the effective TPC command window, or according to whether the last sent PDCCH (i.e., the last PDCCH) is within the window. Alternatively, as long as any one of the PDCCHs is within the effective TPC command window, the TPC command can be used to determine the closed-loop power adjustment state.

It can be described as follows:

$g_{b,f,c}(i,l) = g_{b,f,c}(i-i_0,l) + \Sigma_{m=0}^{\varsigma(C_i)-1} \delta_{PUCCH,b,f,c(m,l)}$ is the current PUCCH power control adjustment state l for active UL BWP b of carrier f of primary cell c and PUCCH transmission occasion i, where the $\delta_{PUCCH,b,f,c}$ values are given in Table 7.1.2-1. $\Sigma_{m=0}^{\varsigma(C_i)-1} \delta_{PUCCH,b,f,c(m,l)}$ is a sum of TPC command values in a set C, of TPC command values with cardinality $\varsigma(C_i)$ that the UE receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of primary cell c for PUCCH power control adjustment state, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i. If repetition is configured to the PDCCH carrying TPC command, only the first PDCCH or the last PDCCH among PDCCH repetitions is applied for calculation of $\Sigma_{m=0}^{\varsigma(C_i)-1}\delta_{PUCCH,b,f,c(m,l)}$, or is applied to determine whether the TPC command is accumulated.

If the PUCCH transmission is in response to a detection by the UE of a DCI format, $K_{PUCCH}(i)$ is a number of symbols for active UL BWP b of carrier f of primary cell c after a last symbol of a corresponding PDCCH reception and before a first symbol of the PUCCH transmission. If repetition is configured to the corresponding PDCCH, the first PDCCH or the last PDCCH among PDCCH repetitions is applied.

$g_{b,f,c}(i,l)=g_{b,f,c}(i-i_0,l)+\Sigma_{m=0}^{\varsigma(C_i)-1}\delta_{PUCCH,b,f,c(m,l)}$ is the current PUCCH power control adjustment state l corresponding to PUCCH transmission occasion i in active UL BWP b of carrier f of primary cell c, where the $\delta_{PUCCH,b,f,c}$ values are given in Table 7.1.2-1. $\Sigma_{m=0}^{\varsigma(C_i)-1}\delta_{PUCCH,b,f,c(m,l)}$ is a sum of command values indicated by the TPC command in a set $C_i$ of TPC command values with cardinality $\varsigma(C_i)$ that is a TPC command received by UE between $K_{PUCCH}$ $(i-i_0)$ 1 symbols (i.e., the first OFDM symbol after PDCCH scheduling PUSCH transmission occasion $i-i_0$) before PUCCH transmission occasion $i-i_0$ and $K_{PUCCH}(i)$ symbols (i.e., the last OFDM symbol of PDCCH scheduling PUSCH transmission occasion i) before PUCCH transmission occasion i for PUCCH power control adjustment state l, where $i_0>0$ is the smallest integer for which $K_{PUCCH}(i-i_0)$ symbols (i.e., the last OFDM symbol of PDCCH scheduling PUSCH transmission occasion $i-i_0$) before PUCCH transmission occasion $i-i_0$ is earlier than $K_{PUCCH}(i)$ symbols (i.e., the last OFDM symbol of PDCCH scheduling PUSCH transmission occasion i) before PUCCH transmission occasion i. If repetition is configured to the PDCCH carrying TPC command, only the headmost PDCCH or the last PDCCH among PDCCH repetitions is applied for calculation of $\Sigma_{m=0}^{\varsigma(C_i)-1}\delta_{PUCCH,b,f,c(m,l)}$, or is applied to determine whether the TPC command is accumulated.

If the PUCCH transmission is in response to a detection by the UE of a DCI format, $K_{PUCCH}(i)$ is a number of symbols after a last symbol of a corresponding PDCCH reception and before a first symbol of the PUCCH transmission. If repetition is configured to the corresponding PDCCH, the headmost PDCCH or the last PDCCH among PDCCH repetitions is applied.

In S1703, a transmit power of the PUCCH is determined according to the closed-loop power adjustment state.

After the closed-loop power adjustment state of the PUCCH is determined, the transmit power of the PUCCH can be determined according to the processing method of the accumulation mode described in the above embodiment. Its specific implementation manners may refer to the introduction of the above embodiments, and will not be repeated here.

In the power control method provided by the embodiments of the present application, when the PDCCH scheduling the uplink signal or the PDCCH carrying the TPC command of the uplink signal is repeatedly transmitted, the terminal device may determine one reference PDCCH from the plurality of PDCCHs scheduling the uplink signal to obtain the effective window of TPC, or may determine one reference PDCCH from the plurality of PDCCHs carrying the TPC command to determine whether the TPC is within the effective window, so that the accuracy of the closed-loop power control of the PUCCH can be effectively guaranteed in the accumulation mode.

The above embodiments describe the implementation manners in which the closed-loop power adjustment state is the accumulation mode. In another possible implementation manner, the closed-loop power adjustment state may also be an absolute value mode. For example, the network device configures the current closed-loop power control state as the absolute value mode through high-layer signaling.

In the case where the uplink signal is PUCCH and the closed-loop power adjustment state is the absolute value mode, the implementation manner of the uplink power control is similar to that described above when the uplink signal is the PUSCH and the closed-loop power adjustment state is the absolute value mode, the specific implementations may refer to the introduction in the foregoing embodiments, and details are not repeated here.

Various possible implementation manners in which the uplink signal is PUSCH and PUCCH are described above, and then various possible implementation manners in which the uplink signal is SRS are introduced.

In a possible implementation manner, the closed-loop power adjustment state may be an accumulation mode, for example, the network device configures the current closed-loop power control state of the terminal device to be an accumulation mode through high-layer signaling.

Figure 24:
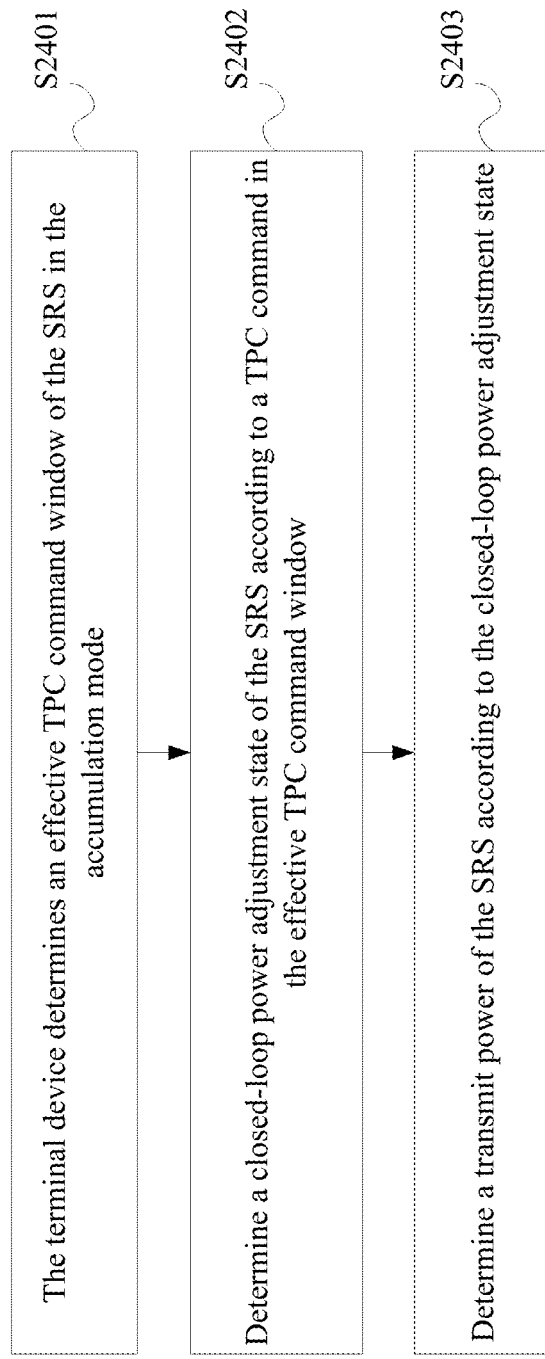
FIG. 24 is a fifth flowchart of a power control method provided by an embodiment of the present application.
Figure 25:
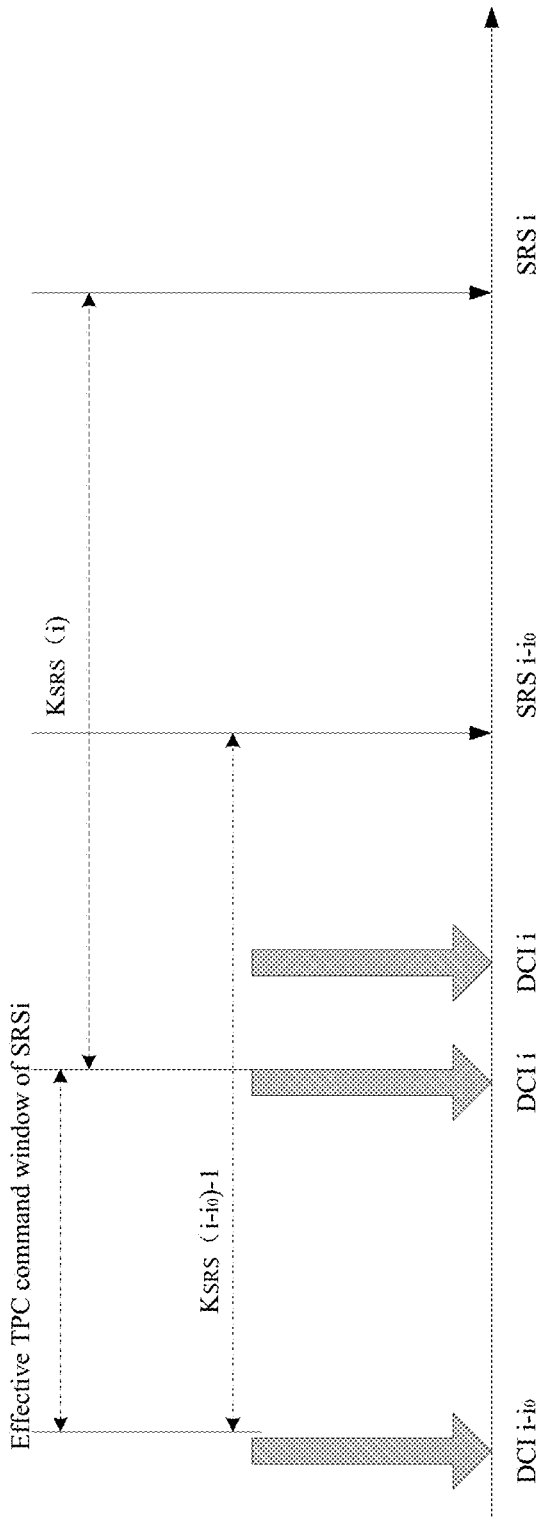
FIG. 25 is a first schematic diagram of an implementation of determining an effective TPC command window of an SRS in the accumulation mode provided by the embodiment of the present application.
Figure 26:
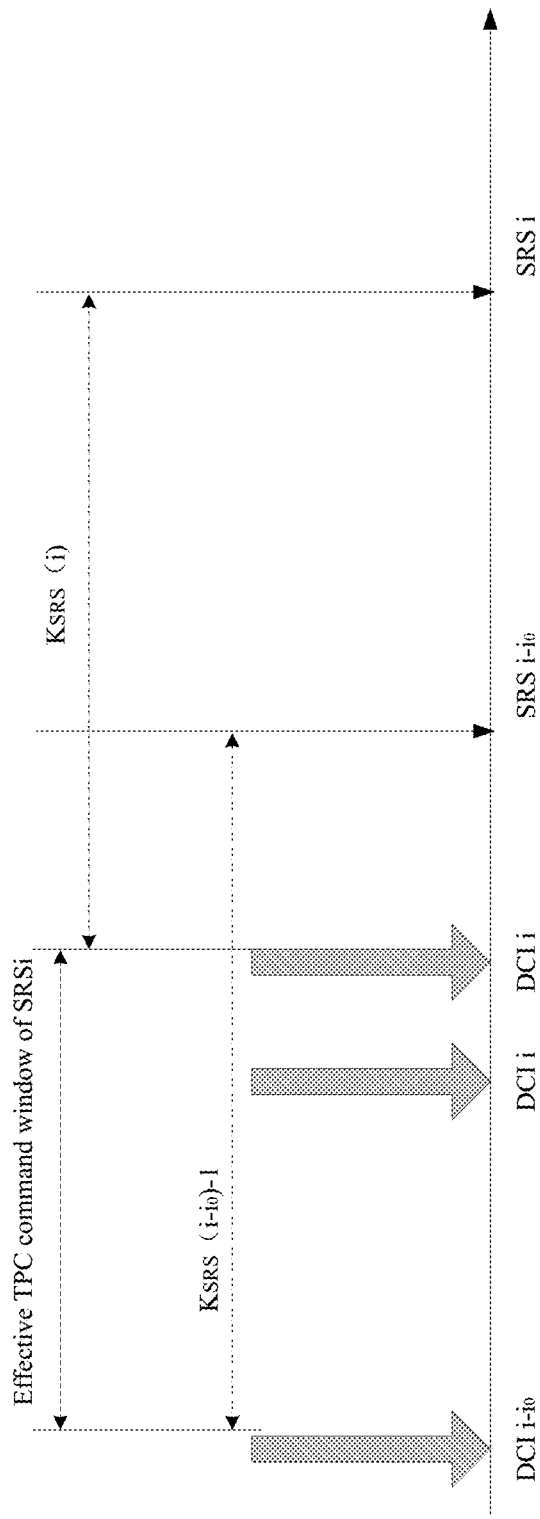
FIG. 26 is a second schematic diagram of the implementation of determining the effective TPC command window of the SRS in the accumulation mode provided by the embodiment of the present application.
Figure 27:
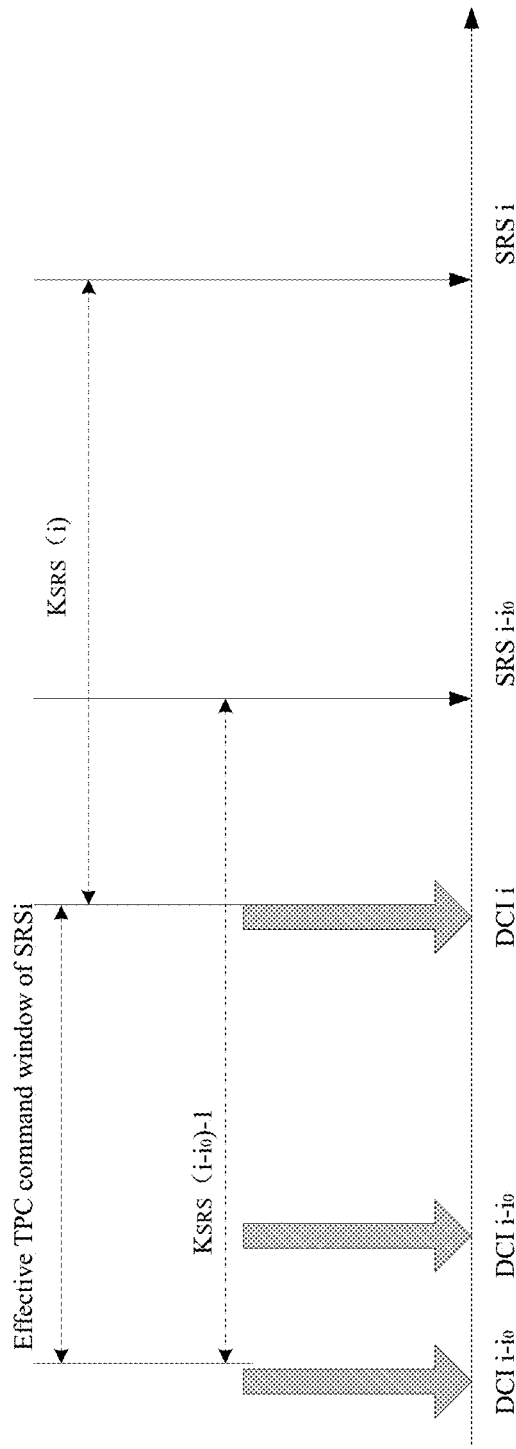
FIG. 27 is a third schematic diagram of the implementation of determining the effective TPC command window of the SRS in the accumulation mode provided by the embodiment of the present application.
Figure 28:
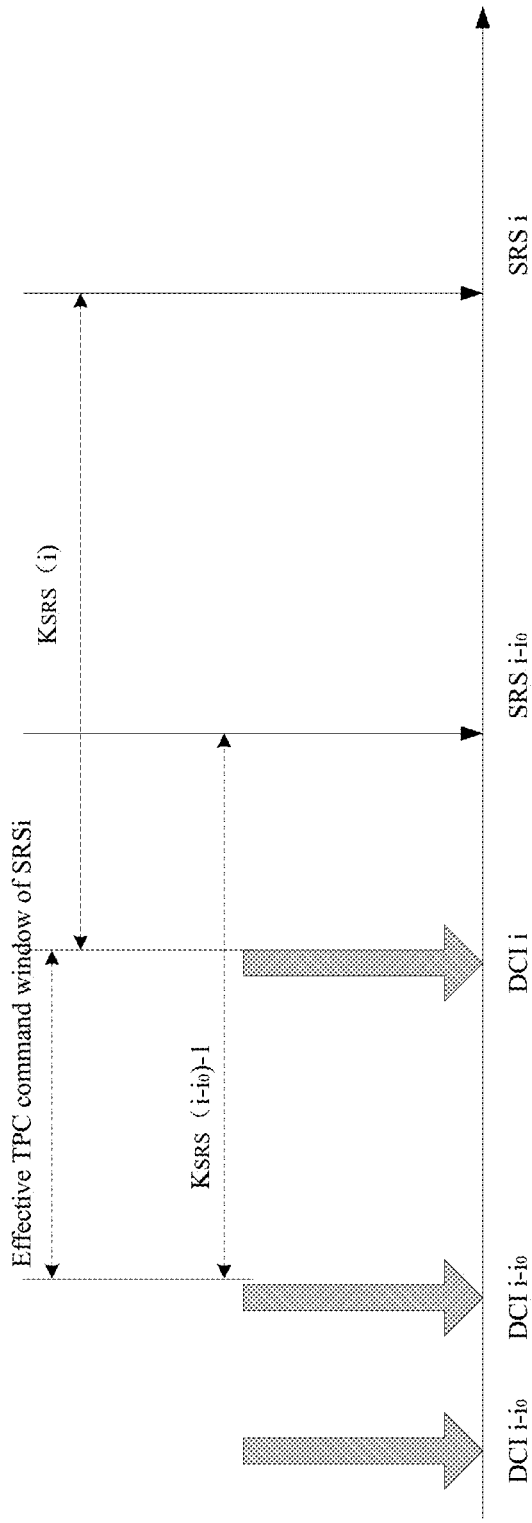
FIG. 28 is a fourth schematic diagram of the implementation of determining the effective TPC command window of the SRS in the accumulation mode provided by the embodiment of the present application.
Figure 29:
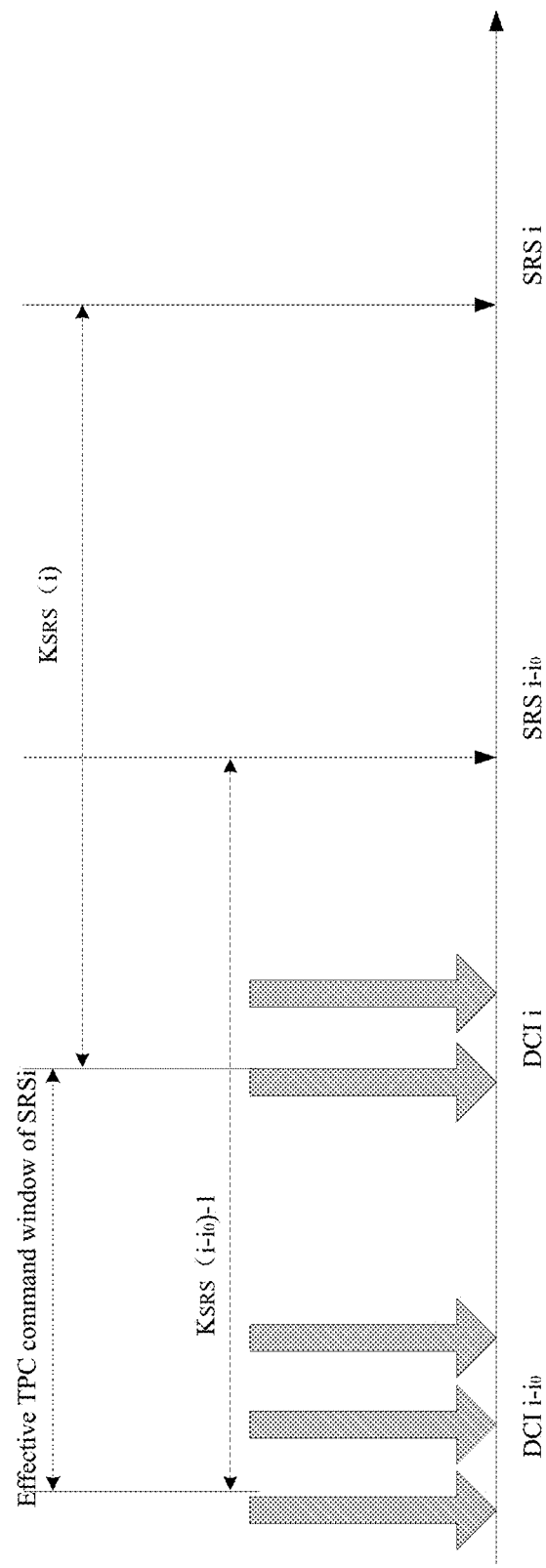
FIG. 29 is a fifth schematic diagram of the implementation of determining the effective TPC command window of the SRS in the accumulation mode provided by the embodiment of the present application.
Figure 30:
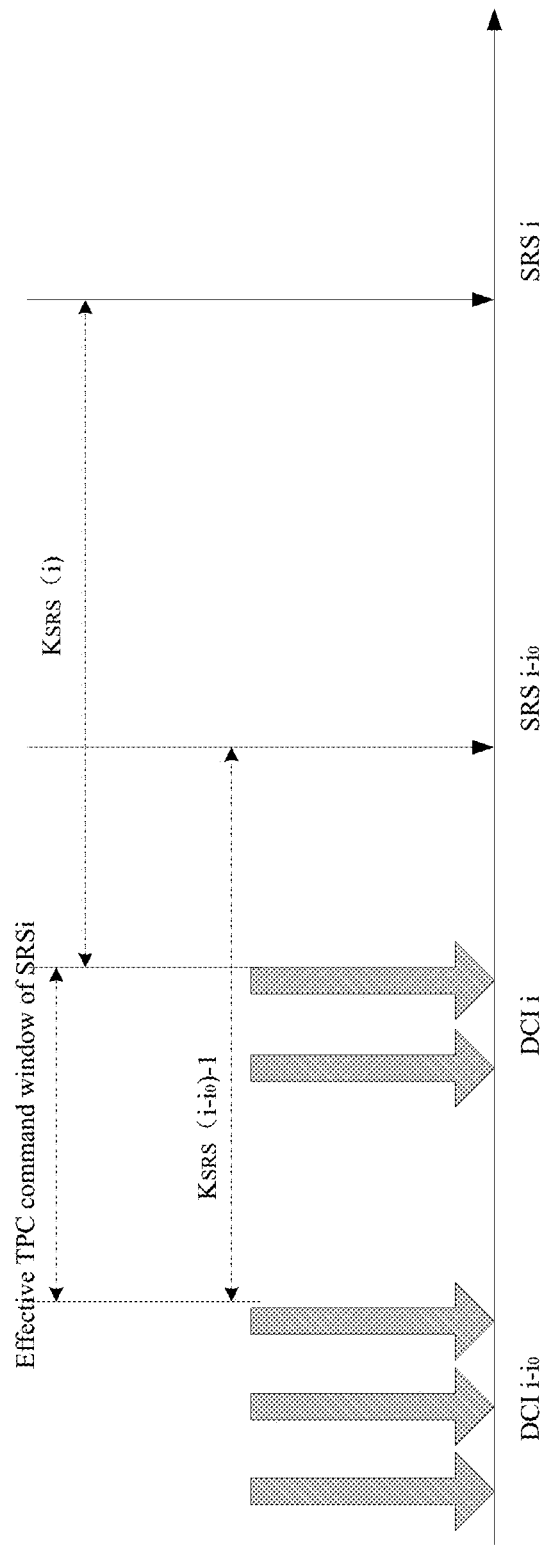
FIG. 30 is a sixth schematic diagram of the implementation of determining the effective TPC command window of the SRS in the accumulation mode provided by the embodiment of the present application.

The following describes the implementation manners of uplink power control in the case that the uplink signal is SRS and the closed-loop power adjustment state is the accumulation mode with reference to FIGS. 24 to 30. FIG. 24 is a fifth flowchart of the power control method provided by the embodiment of the present application. FIG. 25 is a first schematic diagram of the implementation of determining the effective TPC command window of the SRS in the accumulation mode provided by the embodiment of the present application. FIG. 26 is a second schematic diagram of the implementation of determining the effective TPC command window of the SRS in the accumulation mode provided by the embodiment of the present application. FIG. 27 is a third schematic diagram of the implementation of determining the effective TPC command window of the SRS in the accumulation mode provided by the embodiment of the present application. FIG. 28 is a fourth schematic diagram of the implementation of determining the effective TPC command window of the SRS in the accumulation mode provided by the embodiment of the present application. FIG. 29 is a fifth schematic diagram of the implementation of determining the effective TPC command window of the SRS in the accumulation mode provided by the embodiment of the present application. FIG. 30 is a sixth schematic diagram of the implementation of determining the effective TPC command window of the SRS in the accumulation mode provided by the embodiment of the present application.

In S2401, the terminal device determines the effective TPC command window of the SRS in the accumulation mode.

In this embodiment, the SRS may be, for example, an aperiodic SRS. In the current situation, the first PDCCH is the PDCCH used for scheduling the SRS, and the second PDCCH is the PDCCH that schedules the SRS most recently before the PDCCH used for scheduling the SRS. When determining an effective TPC command window, for example, there may be the following possible implementation manners.

In an implementation manner, the plurality of repeatedly transmitted PDCCHs may only include the repeatedly transmitted first PDCCH, that is, the PDCCH that schedules the SRS is configured with repeated transmission (repetition).

In the current situation, the window between the first OFDM symbol after the second PDCCH and the last OFDM symbol of the headmost PDCCH in the repeatedly transmitted first PDCCH may be determined as an effective TPC command window.

For example, it can be understood with reference to FIG. 25. As shown in FIG. 25, there is currently $DCI_{i-i_0}$ for scheduling $SRS_{i-i_0}$ and there is currently $DCI_i$ for scheduling $SRS_i$, $DCI_{i-i_0}$ is the most recent DCI for scheduling SRS before $DCI_i$ for scheduling $SRS_i$, and PDCCH is used to carry DCI, then $DCI_i$ corresponds to the first PDCCH, and $DCI_{i-i_0}$ corresponds to the second PDCCH.

$DCI_i$ is repeatedly transmitted twice. Referring to FIG. 25, currently, the window between the first OFDM symbol after $DCI_{i-i_0}$ and the last OFDM symbol of the first (first sent) $DCI_i$ in the repeatedly transmitted $DCI_i$ is determined as the effective TPC command window.

Alternatively, in the current situation, the window between the first OFDM symbol after the second PDCCH and the last OFDM symbol of the last PDCCH in the repeatedly transmitted first PDCCH may also be determined as the effective TPC command window.

For example, it can be understood with reference to FIG. 26. As shown in FIG. 26, the meaning of each parameter is the same as that in FIG. 25, where $DCI_i$ is repeatedly transmitted twice. Referring to FIG. 26, currently, the window between the first OFDM symbol after $DCI_{i-i_0}$ and the last OFDM symbol of the last (last sent) $DCI_i$ in the repeatedly transmitted $DCI_i$ is determined as the effective TPC command window.

In another implementation manner, the plurality of repeatedly transmitted PDCCHs may only include the repeatedly transmitted second PDCCH, that is to say, the PDCCH that schedules the SRS most recently before the PDCCH used to schedule the SRS is configured with a repetition transmission (repetition).

In the current situation, the window between the first OFDM symbol after the headmost PDCCH in the repeatedly transmitted second PDCCH and the last OFDM symbol of the first PDCCH may be determined as the effective TPC command window.

For example, it can be understood with reference to FIG. 27. As shown in FIG. 27, the meaning of each parameter is the same as that in FIG. 25, where $DCI_{i-i_0}$ is repeatedly transmitted twice. With reference to FIG. 27, currently, the window between the first OFDM symbol after the first (first sent) $DCI_{i-i_0}$ in the repeatedly transmitted $DCI_{i-i_0}$ and the last OFDM symbol of $DCI_i$ is determined as the effective TPC command window.

In the current situation, the window between the first OFDM symbol after the last PDCCH in the repeatedly transmitted second PDCCH and the last OFDM symbol of the first PDCCH may also be determined as the effective TPC command window.

For example, it can be understood with reference to FIG. 28. As shown in FIG. 28, the meaning of each parameter is the same as that in FIG. 25, where $DCI_{i-i_0}$ is repeatedly transmitted twice. With reference to FIG. 28, currently, the window between the first OFDM symbol after the last (last sent) $DCI_{i-i_0}$ in the repeatedly transmitted $DCI_{i-i_0}$ and the last OFDM symbol of $DCI_i$ may be determined as the effective TPC command window.

In another embodiment, the plurality of repeatedly transmitted PDCCHs may include a repeatedly transmitted first PDCCH and a repeatedly transmitted second PDCCH at the same time, that is, both are configured with repetition transmission (repetition).

In the current situation, the window between the first OFDM symbol after the headmost PDCCH in the repeatedly transmitted second PDCCH and the last OFDM symbol of the headmost PDCCH in the repeatedly transmitted first PDCCH may be determined as the effective TPC command window.

For example, it can be understood with reference to FIG. 29. As shown in FIG. 29, the meaning of each parameter is the same as that in FIG. 25, where $DCI_{i-i_0}$ is repeatedly transmitted three times, and $DCI_i$ is repeatedly transmission twice. With reference to FIG. 29, currently, the window between the first OFDM symbol after the first (first sent) $DCI_{i-i_0}$ in the repeatedly transmitted $DCI_{i-i_0}$ and the last OFDM symbol of the first (first sent) $DCI_i$ in the repeatedly transmitted $DCI_i$ may be determined as the effective TPC command window.

In the current situation, the window between the first OFDM symbol after the last PDCCH in the repeatedly transmitted second PDCCH and the last OFDM symbol of the last PDCCH in the repeatedly transmitted first PDCCH may also be determined as the effective TPC command window.

For example, it can be understood with reference to FIG. 30. As shown in FIG. 30, the meaning of each parameter is the same as that in FIG. 25, where $DCI_{i-i_0}$ is repeatedly transmitted three times, and $DCI_i$ is repeatedly transmission twice. With reference to FIG. 30, currently, the window between the first OFDM symbol after the last (last sent) $DCI_{i-i_0}$ in the repeatedly transmitted $DCI_{i-i_0}$ and the last OFDM symbol of the last (last sent) $DCI_i$ in the repeatedly transmitted $DCI_i$ may be determined as the effective TPC command window.

The above has introduced several possible implementation manners for determining the effective TPC command window when the uplink signal is an SRS in the accumulation mode with reference to FIG. 25 to FIG. 30, which can be described as follows:

The window is between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i. if the SRS transmission is aperiodic, $K_{SRS}(i)$ is a number of symbols for active UL BWP b of carrier f of serving cell c after a last symbol of a corresponding PDCCH triggering the SRS transmission and before a first symbol of the SRS transmission. If repetition is configured to the corresponding PDCCH, the first PDCCH or the last PDCCH among PDCCH repetitions is applied.

The window is between $K_{SRS}(i-i_0)-1$ symbols (i.e., the first OFDM symbol after PDCCH triggering the SRS transmission occasion $i-i_0$) before SRS transmission occasion $i-i_0$ and $K_{SRS}(i)$ symbols (i.e., the last OFDM symbol of PDCCH triggering the SRS transmission occasion i) before SRS transmission occasion i on active UL BWP b of carrier f of serving cell c for SRS power control adjustment state l, where $i_0>0$ is the smallest integer for which $K_{SRS}(i-i_0)$ symbols (i.e., the last OFDM symbol of PDCCH triggering the SRS transmission occasion $i-i_0$) before PUCCH transmission occasion $i-i_0$ is earlier than $K_{SRS}(i)$ symbols (i.e., the last OFDM symbol of PDCCH triggering the SRS transmission occasion i) before SRS transmission occasion i. if the SRS transmission is aperiodic, $K_{SRS}(i)$ is a number of symbols after a last symbol of a PDCCH triggering the SRS transmission and before a first symbol of the SRS transmission. If repetition is configured to the corresponding PDCCH, the first PDCCH or the last PDCCH among PDCCH repetitions is applied.

That is to say, if the PDCCH used to determine the effective TPC command window is configured with repeated transmission, the headmost PDCCH (the first sent PDCCH) or the last PDCCH (the last sent PDCCH) in the repeatedly transmitted PDCCH is used to determine the effective TPC command window.

And in this embodiment, when the terminal device determines the TPC effective command window, it needs to determine the second PDCCH, and then it needs to determine whether one PDCCH is a PDCCH for scheduling another SRS most recently before the PDCCH for scheduling the SRS. If neither the PDCCH that schedules the SRS nor the most recent PDCCH that schedules another SRS is configured with repeated transmission, the determination may be directly made.

However, if the PDCCH that currently schedules the SRS or the PDCCH that schedules another SRS most recently is configured with repeated transmission, the terminal needs to determine one PDCCH from the plurality of repeatedly transmitted PDCCHs for the above determination process.

For example, the terminal device may use the first sent PDCCH or the last sent PDCCH among the plurality of repeatedly transmitted PDCCHs for the above determination.

In a possible implementation manner, if the PDCCH that schedules another SRS most recently before the PDCCH for scheduling the SRS is one PDCCH of the plurality of repeatedly transmitted PDCCHs, that is, it is configured with repeated transmission, then for example, the above determination is made according to the last PDCCH among the plurality of repeatedly transmitted PDCCHs. If the last PDCCH is before the first PDCCH, it can be determined that the PDCCH can be used as the second PDCCH to determine the effective TPC command window; otherwise, the PDCCH cannot be used to determine the effective TPC command window, and the terminal needs to set other PDCCH that satisfies the condition as the second PDCCH.

Alternatively, the above determination can also be made according to the headmost PDCCH among the plurality of repeatedly transmitted PDCCHs, then it only needs to be determined that the headmost PDCCH is before the first PDCCH, that is, any one PDCCH in the plurality of repeatedly transmitted PDCCHs before the first PDCCH can be used as the second PDCCH to determine the effective TPC command window.

In another possible implementation manner, if the plurality of repeatedly transmitted PDCCHs include the repeatedly transmitted first PDCCH, that is, the first PDCCH is configured with repeated transmission, then for example, the above determination may be made according to the headmost PDCCH in the repeatedly transmitted first PDCCHs, and then it is only necessary to determine that the second PDCCH is a PDCCH that schedules the uplink signal of the same type most recently before the headmost PDCCH in the repeatedly transmitted first PDCCHs.

Alternatively, the above determination may be made according to the last PDCCH in the repeatedly transmitted first PDCCH, then it is only necessary to determine that the second PDCCH is the PDCCH that schedules the same type of uplink signal before the last PDCCH in the repeatedly transmitted first PDCCH. That is to say, the second PDCCH only needs to precede any one of the repeatedly transmitted first PDCCH.

In S2402, the closed-loop power adjustment state of the SRS is determined according to the TPC command in the effective TPC command window.

In this embodiment, the effective TPC command window includes a TPC command. In the accumulation mode, the adjustment values indicated by the TPC command in the TPC command window need to be accumulated to determine the closed-loop power adjustment state of the SRS. However, if one TPC command is carried by a plurality of repeatedly transmitted PDCCHs, and the terminal device needs to determine whether the TPC command is in the effective TPC command window, that is, it needs to determine whether the current TPC command can be used to determine the closed-loop power adjustment state.

In this embodiment, the TPC command carried by the plurality of repeatedly transmitted PDCCHs is referred to as the first TPC command, then it may be determined whether the first TPC command is in the effective TPC command window according to whether a third PDCCH is in the effective TPC command window, where the third PDCCH is the headmost PDCCH among the plurality of repeatedly transmitted PDCCHs used for carrying the first TPC command, or the third PDCCH is the last PDCCH among the plurality of repeatedly transmitted PDCCHs used for carrying the first TPC command, or, the third PDCCH is any one PDCCH among the plurality of repeatedly transmitted PDCCHs used for carrying the first TPC command.

In a possible implementation manner, if the third PDCCH is in the effective TPC command window, it is determined that the first TPC command is in the effective TPC command window.

Then the current first TPC command can be used to determine the closed-loop power adjustment state. Specifically, the adjustment value indicated by the first TPC command, the adjustment value indicated by the TPC command other than the first TPC command in the effective TPC command window, and the previous closed-loop power adjustment state are added to obtain the current closed-loop power adjustment state.

For example, it can be understood by referring to the following formula 8, $$h_{b,f,c}(i) = h_{b,f,c}(i-i_0) + \Sigma_{m=0}^{q(S_i)-1} \delta_{SRS,b,f,c(m)} \qquad \text{formula 8,}$$

where $h_{b,f,c}(i-i_0)$ is the previous closed-loop power adjustment state, $h_{b,f,c}(i)$ is the current closed-loop power adjustment state, $\delta_{SRS,b,f,c(m)}$ is the adjustment value indicated by the TPC command in the effective TPC command window, and $S_i$ is the TPC command in the effective TPC command window.

In another possible implementation manner, if the third PDCCH is not in the effective TPC command window, it is determined that the first TPC command is not in the effective TPC command window. Then the current first TPC command is not used to determine the closed-loop power adjustment state.

That is to say, if one TPC command is carried by a plurality of repeatedly transmitted PDCCHs, when the terminal device determines whether the TPC command can be used for closed-loop power adjustment, the determination is made according to whether the first PDCCH PDCCH (i.e. the headmost PDCCH) is in the effective TPC command window, or according to whether the last sent PDCCH (i.e., the last PDCCH) is within the window. Alternatively, as long as any one of the PDCCHs is within the effective TPC command window, the TPC command can be used to determine the closed-loop power adjustment state.

It can be described as follows:

$h_{b,f,c}(i) = h_{b,f,c}(i-i_0) + \Sigma_{m=0}^{\varsigma(S_i)-1} \delta_{SRS,b,f,c(m)}$ if the UE is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where the $\delta_{SRS,b,f,c}$ values are given in Table 7.1.1-1. $\delta_{SRS,b,f,c(m)}$ is jointly coded with other TPC commands in a PDCCH with DCI format 2_3, as described in Clause 11.4. $\Sigma_{m=0}^{\varsigma(S_i)-1} \delta_{SRS,b,f,c(m)}$ is a sum of TPC command values in a set $S_i$ of TPC command values with cardinality $\varsigma(S_i)$ that the UE receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i. If repetition is configured to the PDCCH carrying TPC command, only the first PDCCH or the last PDCCH among PDCCH repetitions is applied for calculation of $\Sigma_{m=0}^{\varsigma(S_i)-1} \delta_{SRS,b,f,c(m)}$, or is applied to determine whether the TPC command is accumulated.

If the SRS transmission is aperiodic, $K_{SRS}(i)$ is a number of symbols for active UL BWP b of carrier f of serving cell c after a last symbol of a corresponding PDCCH triggering the SRS transmission and before a first symbol of the SRS transmission. If repetition is configured to the corresponding PDCCH, the first PDCCH or the last PDCCH among PDCCH repetitions is applied.

$h_{b,f,c}(i) = h_{b,f,c}(i-i_0) + \Sigma_{m=0}^{\varsigma(S_i)-1} \delta_{SRS,b,f,c(m)}$, if the UE is not configured for PUSCH transmissions on active UL BWP b of carrier f of serving cell c, or if srs-PowerControlAdjustmentStates indicates separate power control adjustment states between SRS transmissions and PUSCH transmissions, and TPC accumulation mode is provided, where the $\delta_{SRS,b,f,c}$ values are given in Table 7.1.1-1. $\delta_{SRS,b,f,c(m)}$ is jointly coded with other TPC commands in a PDCCH with DCI format 2_3, as described in Clause 11.4. $\Sigma_{m=0}^{\varsigma(S_i)-1} \delta_{SRS,b,f,c(m)}$ is a sum of command values indicated by the TPC command in a set $S_i$ of TPC command values with cardinality $\varsigma(S_i)$ that is a TPC command received by the UE between $K_{SRS}(i-i_0)-1$ symbols (i.e., the first OFDM symbol after PDCCH triggering SRS transmission occasion $i-i_0$) before SRS transmission occasion $i-i_0$ and $K_{SRS}(i)$ symbols (i.e., the last OFDM symbol of PDCCH triggering SRS transmission occasion i) before SRS transmission occasion i on active UL BWP b of carrier f of serving cell c for SRS power control adjustment state l, where $i_0>0$ is the smallest integer for which $K_{SRS}(i-i_0)$ symbols (i.e., the last OFDM symbol of PDCCH triggering SRS transmission occasion $i-i_0$) before SRS transmission occasion $i-i_0$ is earlier than $K_{SRS}(i)$ symbols (i.e., the last OFDM symbol of PDCCH triggering SRS transmission occasion i) before SRS transmission occasion i. If repetition is configured to the PDCCH carrying TPC command, only the first PDCCH or the last PDCCH among PDCCH repetitions is applied for calculation of $\Sigma_{m=0}^{\varsigma(S_i)-1} \delta_{SRS,b,f,c(m)}$ or is applied to determine whether the TPC command is accumulated.

If the SRS transmission is aperiodic, $K_{SRS}(i)$ is a number of OFDM symbols after a last symbol of a PDCCH triggering the SRS transmission and before a first symbol of the SRS transmission. If repetition is configured to the corresponding PDCCH, the first PDCCH or the last PDCCH among PDCCH repetitions is applied.

In S2403, a transmit power of the SRS is determined according to the closed-loop power adjustment state.

After the closed-loop power adjustment state of the SRS is determined, the transmit power of the SRS can be determined according to the processing method of the accumulation mode described in the above-mentioned embodiment. Its specific implementation manners may refer to the introduction of the above embodiments, and will not be repeated here.

In the power control method provided by the embodiment of the present application, when the PDCCH scheduling the uplink signal or the PDCCH carrying the TPC command of the uplink signal is repeatedly transmitted, the terminal device may determine one reference PDCCH from the plurality of PDCCHs scheduling the uplink signal to obtain the effective window of TPC, or may determine one reference PDCCH from the plurality of PDCCHs carrying the TPC command to determine whether the TPC is within the effective window, so that the accuracy of the closed-loop power control of the SRS can be effectively guaranteed in the accumulation mode.

The above embodiments describe the implementation manners in which the closed-loop power adjustment state is the accumulation mode. In another possible implementation manner, the closed-loop power adjustment state may also be an absolute value mode. For example, the network device configures the current closed-loop power control state as the absolute value mode through high-layer signaling.

In the case where the uplink signal is SRS and the closed-loop power adjustment state is the absolute value mode, the implementation manner of the uplink power control is similar to that described above when the uplink signal is the PUSCH and the closed-loop power adjustment state is the absolute value mode, the specific implementations may refer to the introduction in the foregoing embodiments, and details are not repeated here.

Based on the above embodiments, in the power control method provided by the present application, a plurality of PDCCHs transmitted repeatedly occupy different time domain resources, for example, occupy different OFDM symbols in one slot or occupy different slots.

And, the plurality of PDCCHs transmitted repeatedly are transmitted through different search spaces, and different search spaces are associated with different CORESETs, that is, the search spaces and CORESETs occupied by the plurality of PDCCHs are different.

For example, the first of the repeatedly transmitted PDCCH is transmitted through search space 1 and CORESET1 associated with search space 1, and the second of the repeatedly transmitted PDCCH is transmitted through search space 2 and CORESET2 associated with search space 2.

To sum up, based on the power control method provided by the present application, when the PDCCH scheduling the uplink signal or the PDCCH carrying the TPC command of the uplink signal is repeatedly transmitted, the terminal device can determine one PDCCH from the plurality of PDCCHs scheduling the uplink signal to obtain the effective window of the TPC, or can determine one PDCCH from the plurality of PDCCHs carrying the TPC command to determine whether the TPC is within the effective window, so as to ensure the accuracy of closed-loop power control in the case of repeated transmission of PDCCH.

Figure 31:
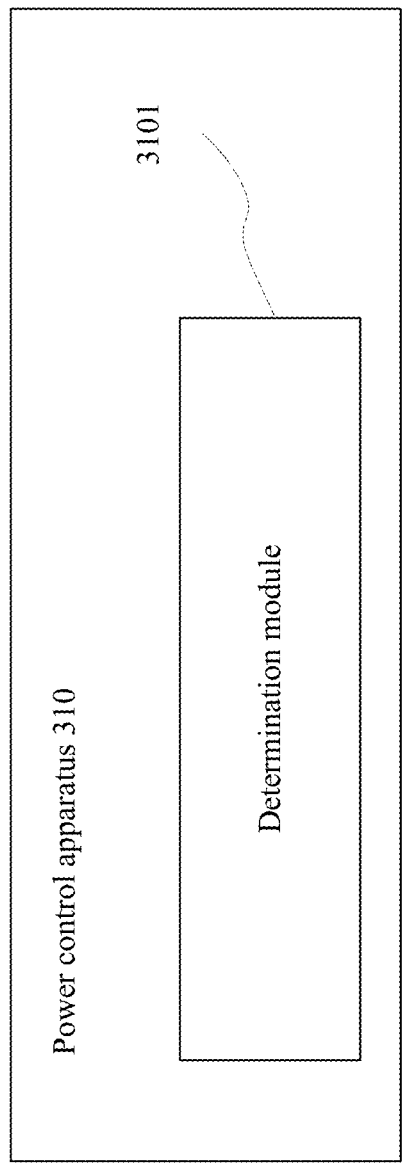
FIG. 31 is a schematic structural diagram of a power control apparatus provided by an embodiment of the present application.

FIG. 31 is a schematic structural diagram of a power control apparatus provided by an embodiment of the present application. Referring to FIG. 31, the communication apparatus 310 may include a determination module 3101.

The determination module 3101 is configured to determine an effective transmit power control (TPC) command window according to a preset physical downlink control channel (PDCCH) in a plurality of repeatedly transmitted PDCCHs, the preset PDCCH includes a headmost PDCCH or a last PDCCH in the plurality of PDCCHs.

The determination module 3101 is further configured to determine a closed-loop power adjustment state according to a TPC command in the effective TPC command window; and The determination module 3101 is further configured to determine a transmit power of an uplink signal of a terminal device according to the closed-loop power adjustment state.

In a possible implementation manner, the plurality of repeatedly transmitted PDCCHs include a repeatedly transmitted first PDCCH and/or a repeatedly transmitted second PDCCH, where the first PDCCH is a PDCCH used for scheduling the uplink signal, and the second PDCCH is a PDCCH for scheduling a same type of uplink signal most recently before the PDCCH used for scheduling the uplink signal.

In a possible implementation manner, if the plurality of repeatedly transmitted PDCCHs include the repeatedly transmitted second PDCCH, a last PDCCH in the repeatedly transmitted second PDCCH is before the first PDCCH, or, a headmost PDCCH in the repeatedly transmitted second PDCCH is before the first PDCCH.

In a possible implementation manner, if the plurality of repeatedly transmitted PDCCHs include the repeatedly transmitted first PDCCH, the second PDCCH is a PDCCH for scheduling a same type of uplink signal most recently before a headmost PDCCH in the repeatedly transmitted first PDCCH, or, the second PDCCH is a PDCCH for scheduling a same type of uplink signal most recently before a last PDCCH in the repeatedly transmitted first PDCCH.

In a possible implementation manner, the closed-loop power adjustment state is an accumulation mode, and the plurality of repeatedly transmitted PDCCHs include a repeatedly transmitted first PDCCH.

The determination module 3101 is specifically configured to determine a window between a first OFDM symbol after a second PDCCH and a last OFDM symbol of a headmost PDCCH in the repeatedly transmitted first PDCCH as the effective TPC command window.

In a possible implementation manner, the closed-loop power adjustment state is an accumulation mode, and the plurality of repeatedly transmitted PDCCHs include a repeatedly transmitted first PDCCH. The determination module 3101 is specifically configured to determine a window between a first OFDM symbol after a second PDCCH and a last OFDM symbol of a last PDCCH in the repeatedly transmitted first PDCCH as the effective TPC command window.

In a possible implementation manner, the closed-loop power adjustment state is an accumulation mode, and the plurality of repeatedly transmitted PDCCHs include a repeatedly transmitted second PDCCH. The determination module 3101 is specifically configured to determine a window between a first OFDM symbol after a headmost PDCCH in the repeatedly transmitted second PDCCH and a last OFDM symbol of a first PDCCH as the effective TPC command window.

In a possible implementation manner, the closed-loop power adjustment state is an accumulation mode, and the plurality of repeatedly transmitted PDCCHs include a repeatedly transmitted second PDCCH. The determination module 3101 is specifically configured to determine a window between a first OFDM symbol after a last PDCCH in the repeatedly transmitted second PDCCH and a last OFDM symbol of a first PDCCH as the effective TPC command window.

In a possible implementation manner, the closed-loop power adjustment state is an accumulation mode, and the plurality of repeatedly transmitted PDCCHs include a repeatedly transmitted first PDCCH and a repeatedly transmitted second PDCCH. The determination module 3101 is specifically configured to determine a window between a first OFDM symbol after a headmost PDCCH in the repeatedly transmitted second PDCCH and a last OFDM symbol of a headmost PDCCH in the repeatedly transmitted first PDCCH as the effective TPC command window.

In a possible implementation manner, the closed-loop power adjustment state is an accumulation mode, and the plurality of repeatedly transmitted PDCCHs include a repeatedly transmitted first PDCCH and a repeatedly transmitted second PDCCH. The determination module 3101 is specifically configured to determine a window between a first OFDM symbol after a last PDCCH in the repeatedly transmitted second PDCCH and a last OFDM symbol of a last PDCCH in the repeatedly transmitted first PDCCH as the effective TPC command window.

In a possible implementation manner, the closed-loop power adjustment state is an absolute value mode, and the uplink signal is scheduled by a high-level signaling. The determination module 3101 is further configured to determine a window before a preset number of symbols before the uplink signal as the effective TPC command window, and the preset number is a number of OFDM symbols in one slot multiplied by a first numerical value, and the first numerical value is configured by a Radio resource control (RRC) signaling.

In a possible implementation manner, the determination module 3101 is further configured to: if a first TPC command is carried by a plurality of repeatedly transmitted PDCCHs, determine whether the first TPC command is in the effective TPC command window according to whether a third PDCCH is in the effective TPC command window, where the third PDCCH is a headmost PDCCH among the plurality of repeatedly transmitted PDCCHs used for carrying the first TPC command, or the third PDCCH a last PDCCH among the plurality of repeatedly transmitted PDCCHs used for carrying the first TPC command, or the third PDCCH is any one PDCCH among the plurality of repeatedly transmitted PDCCHs used for carrying the first TPC command.

In a possible implementation manner, the determination module 3101 is specifically configured to: if the third PDCCH is in the effective TPC command window, determine that the first TPC command is in the effective TPC command window; or, if the third PDCCH is not in the effective TPC command window, determine that the first TPC command is not in the effective TPC command window.

In a possible implementation manner, the determination module 3101 is specifically configured to: add an adjustment value indicated by the first TPC command, an adjustment value indicated by the TPC commands other than the first TPC command in the effective TPC command window, and a previous closed-loop power adjustment state to obtain a current closed-loop power adjustment state.

In a possible implementation manner, a mode of the closed-loop power adjustment state is an absolute value mode, if the first TPC command is in the effective TPC command window, and the first TPC command is a last TPC command in the effective TPC the command window. The determination module 3101 is specifically configured to determine an adjustment value indicated by the last TPC command as a current closed-loop power adjustment state.

In a possible implementation manner, the uplink signal includes at least one of the following: a physical uplink shared channel (PUSCH), a physical uplink control channel (PUCCH), or a sounding reference signal (SRS).

In a possible implementation manner, the plurality of repeatedly transmitted PDCCHs occupy different time domain resources.

The power control apparatus provided in the embodiments of the present application can implement the technical solutions shown in the foregoing method embodiments, and the implementation principles and beneficial effects thereof are similar, which will not be repeated here.

Figure 32:
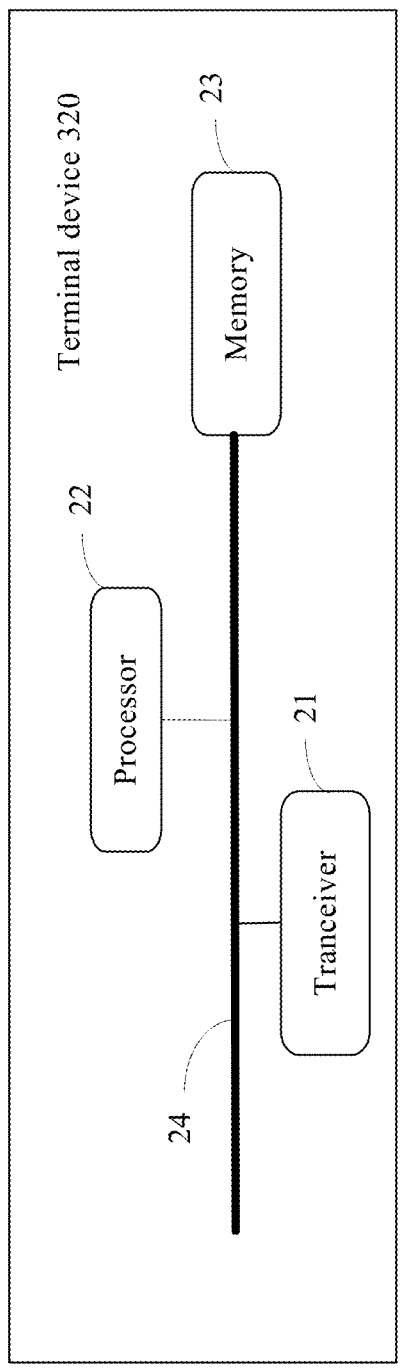
FIG. 32 is a schematic structural diagram of a terminal device provided by an embodiment of the present application.

FIG. 32 is a schematic structural diagram of a terminal device provided by an embodiment of the present application. Referring to FIG. 32, the terminal device 320 may include: a transceiver 21, a memory 22, and a processor 23. The transceiver 21 may include: a transmitter and/or a receiver. The transmitter may also be referred to as a sender, a transmitter, a sending port, or a sending interface, or the like, and the receiver may be referred to as a receiver, receiving machine, a receiving port, or a receiving interface, or the like. Exemplarily, the transceiver 21, the memory 22, and the processor 23 are connected to each other through a bus 24.

The memory 22 is configured to store program instructions.

The processor 23 is configured to execute the program instructions stored in the memory, so as to make the terminal device 140 execute any of the power control methods shown above.

The receiver of the transceiver 21 may be is configured to perform the receiving function of the terminal device in the above power control method.

An embodiment of the present application provides a computer-readable storage medium, where computer-executable instructions are stored in the computer-readable storage medium, and when the computer-executable instructions are executed by a processor, the above power control method is implemented.

An embodiment of the present application may further provide a computer program product, which can be executed by a processor, and when the computer program product is executed, any of the power control methods performed by the terminal device shown above can be implemented.

The terminal device, the computer-readable storage medium, and the computer program product of the embodiments of the present application can execute the power control method executed by the terminal device. For the specific implementation process and beneficial effects, the above may be referred to, which will not be repeated here.

In the several embodiments provided in the present application, it should be understood that the disclosed system, apparatus and method may be implemented in other manners. For example, the apparatus embodiments described above are only illustrative. For example, the division of the units is only a logical function division. In actual implementation, there may be other division methods. For example, a plurality of units or components may be combined or may be integrated into another system, or some features can be ignored, or not implemented. On the other hand, the shown or discussed mutual coupling or direct coupling or communication connection may be indirect coupling or communication connection of devices or units through some interfaces, and may be in electrical, mechanical or other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in the present embodiment.

In addition, each functional unit in each embodiment of the present application may be integrated into one processing unit, or each unit may exist physically alone, or two or more units may be integrated into one unit. The above-mentioned integrated units may be implemented in the form of hardware, or may be implemented in the form of software functional units.

Those of ordinary skill in the art can understand that all or part of the steps of implementing the above method embodiments may be completed by program instructing the related hardware. The aforementioned computer program may be stored in a computer-readable storage medium. When the computer program is executed by the processor, it implements the steps including the above method embodiments; and the aforementioned storage medium includes: ROM, RAM, magnetic disk or optical disk and other media that can store program codes.

Finally, it should be noted that the above embodiments are only used to illustrate the technical solutions of the present application, but not to limit them; although the present application has been described in detail with reference to the foregoing embodiments, those of ordinary skill in the art should understand that: the technical solutions described in the foregoing embodiments can be modified, or some or all of the technical features thereof can be equivalently replaced; and these modifications or replacements do not make the essence of the corresponding technical solutions deviate from the scope of the technical solutions of the embodiments of the present application.

What is claimed is:

1. A power control method, comprising:
   determining an effective transmit power control (TPC) command window according to a preset physical downlink control channel (PDCCH) in a plurality of repeatedly transmitted PDCCHs, wherein the preset PDCCH comprises a last PDCCH in the plurality of PDCCHs;
   determining a closed-loop power adjustment state according to a TPC command in the effective TPC command window; and
   determining a transmit power of an uplink signal of a terminal device according to the closed-loop power adjustment state,
   wherein the plurality of repeatedly transmitted PDCCHs comprises:
      a first PDCCH used for scheduling the uplink signal, and
      a repeatedly transmitted second PDCCH used for scheduling a same type of uplink signal most recently before the first PDCCH used for scheduling the uplink signal, wherein a last PDCCH in the repeatedly transmitted second PDCCH is transmitted before the first PDCCH, and
   wherein determining the effective TPC command window according to the preset PDCCH in the plurality of repeatedly transmitted PDCCHs comprises:
      determining a window between a first OFDM symbol after the last PDCCH in the repeatedly transmitted second PDCCH and a last OFDM symbol of the first PDCCH as the effective TPC command window.

2. The method according to claim 1, wherein the first PDCCH is a headmost PDCCH or a last PDCCH in a plurality of repeatedly transmitted PDCCHs used for scheduling the uplink signal.

3. The method according to claim 1, wherein the closed-loop power adjustment state is an accumulation mode.

4. The method according to claim 1, wherein the closed-loop power adjustment state is an accumulation mode, and the first PDCCH is repeatedly transmitted;
the determining the effective transmit power control (TPC) command window according to the preset physical downlink control channel (PDCCH) in the plurality of repeatedly transmitted PDCCHs comprises:
determining a window between the first OFDM symbol after the last PDCCH in the repeatedly transmitted second PDCCH and a last OFDM symbol of a last PDCCH in the repeatedly transmitted first PDCCH as the effective TPC command window.

5. The method according to claim 1, wherein the uplink signal comprises at least one of: a physical uplink shared channel (PUSCH), a physical uplink control channel (PUCCH), or a sounding reference signal (SRS).

6. The method according to claim 1, wherein the plurality of repeatedly transmitted PDCCHs occupy different time domain resources.

7. A power control apparatus, comprising:
a transceiver, a processor, and a memory;
wherein the memory stores computer-executable instructions;
the processor executes the computer-executable instructions stored in the memory, causing the processor to:
determine an effective transmit power control (TPC) command window according to a preset physical downlink control channel (PDCCH) in a plurality of repeatedly transmitted PDCCHs, wherein the preset PDCCH comprises a last PDCCH in the plurality of PDCCHs;
determine a closed-loop power adjustment state according to a TPC command in the effective TPC command window; and
determine a transmit power of an uplink signal of a terminal device according to the closed-loop power adjustment state,
wherein the plurality of repeatedly transmitted PDCCHs comprises:
a first PDCCH used for scheduling the uplink signal, and
a repeatedly transmitted second PDCCH used for scheduling a same type of uplink signal most recently before the first PDCCH used for scheduling the uplink signal, wherein a last PDCCH in the repeatedly transmitted second PDCCH is transmitted before the first PDCCH, and
wherein in determining the effective TPC command window according to the preset PDCCH in the plurality of repeatedly transmitted PDCCHs, the processor is specifically configured to:
determine a window between a first OFDM symbol after the last PDCCH in the repeatedly transmitted second PDCCH and a last OFDM symbol of the first PDCCH as the effective TPC command window.

8. The apparatus according to claim 7, wherein the first PDCCH is a headmost PDCCH or a last PDCCH in a plurality of repeatedly transmitted PDCCHs used for scheduling the uplink signal.

9. The apparatus according to claim 7, wherein the closed-loop power adjustment state is an accumulation mode.

10. The apparatus according to claim 7, wherein the closed-loop power adjustment state is an accumulation mode, and the first PDCCH is repeatedly transmitted;
the processor is specifically configured to:
determine a window between the first OFDM symbol after the last PDCCH in the repeatedly transmitted second PDCCH and a last OFDM symbol of a last PDCCH in the repeatedly transmitted first PDCCH as the effective TPC command window.

11. The apparatus according to claim 7, wherein the uplink signal comprises at least one of: a physical uplink shared channel (PUSCH), a physical uplink control channel (PUCCH), or a sounding reference signal (SRS).

12. The apparatus according to claim 7, wherein the plurality of repeatedly transmitted PDCCHs occupy different time domain resources.

13. A non-transitory computer-readable storage medium, wherein computer-executable instructions are stored in the computer-readable storage medium, and when the computer-executable instructions are executed by a processor, the processor is configured to:
determine an effective transmit power control (TPC) command window according to a preset physical downlink control channel (PDCCH) in a plurality of repeatedly transmitted PDCCHs, wherein the preset PDCCH comprises a last PDCCH in the plurality of PDCCHs;
determine a closed-loop power adjustment state according to a TPC command in the effective TPC command window; and
determine a transmit power of an uplink signal of a terminal device according to the closed-loop power adjustment state,
wherein the plurality of repeatedly transmitted PDCCHs comprises:
a first PDCCH used for scheduling the uplink signal, and
a repeatedly transmitted second PDCCH used for scheduling a same type of uplink signal most recently before the first PDCCH used for scheduling the uplink signal, wherein a last PDCCH in the repeatedly transmitted second PDCCH is transmitted before the first PDCCH, and
wherein in determining the effective TPC command window according to the preset PDCCH in the plurality of repeatedly transmitted PDCCHs, the processor is further configured to:
determine a window between a first OFDM symbol after the last PDCCH in the repeatedly transmitted second PDCCH and a last OFDM symbol of the first PDCCH as the effective TPC command window.

* * * * *